US009693348B2

(12) United States Patent
Zhang et al.

(10) Patent No.: US 9,693,348 B2
(45) Date of Patent: Jun. 27, 2017

(54) BASE STATION RESOURCE ALLOCATION

(71) Applicant: Huawei Technologies Co., Ltd., Shenzhen (CN)

(72) Inventors: Weiliang Zhang, Beijing (CN); Hantao Li, Beijing (CN); Jie Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/079,799

(22) Filed: Mar. 24, 2016

(65) Prior Publication Data
US 2016/0205675 A1 Jul. 14, 2016

Related U.S. Application Data

(63) Continuation of application No. PCT/CN2014/087265, filed on Sep. 24, 2014.

(30) Foreign Application Priority Data

Sep. 25, 2013 (CN) .......................... 2013 1 0442052

(51) Int. Cl.
*H04W 72/00* (2009.01)
*H04W 72/04* (2009.01)
(Continued)

(52) U.S. Cl.
CPC ........... *H04W 72/044* (2013.01); *H04W 4/06* (2013.01); *H04W 16/10* (2013.01); *H04W 48/16* (2013.01);
(Continued)

(58) Field of Classification Search
CPC ........... H04W 72/044; H04W 72/1226; H04W 74/02; H04W 74/04; H04W 8/02; H04W 5/0055
(Continued)

(56) References Cited

U.S. PATENT DOCUMENTS 8,817,709 B2   8/2014 Wu et al.
8,885,507 B2  11/2014 Chen et al.
(Continued)

FOREIGN PATENT DOCUMENTS

CN   102792745 A   11/2012
CN   102857969 A    1/2013
(Continued)

OTHER PUBLICATIONS

Baccelli, F. et al., "On the Design of Device-to-Device Autonomous Discovery," Fourth International Conference on Communication Systems and Networks, Jan. 3-7, 2012, pp. 1-9, Bangalore.
(Continued)

*Primary Examiner* — William D Cumming
(74) *Attorney, Agent, or Firm* — Slater Matsil, LLP

(57) ABSTRACT

Embodiments provide a resource allocation method, apparatus and system. The resource allocation method is used for a base station. The method includes acquiring a current resource indication of a cell, and generating a resource adjustment indication according to the current resource indication of the cell. The resource adjustment indication is used for instructing a mobility management entity MME to adjust a discovery resource allocated to the cell. The method also includes generating a resource adjustment request, where the resource adjustment request includes the resource adjustment indication. The method also includes sending the resource adjustment request, so that the MME adjusts the discovery resource of the cell according to the resource adjustment request.

12 Claims, 10 Drawing Sheets

(51) Int. Cl.
*H04W 4/06* (2009.01)
*H04W 48/16* (2009.01)
*H04W 16/10* (2009.01)
*H04W 72/02* (2009.01)
*H04W 48/12* (2009.01)

(52) U.S. Cl.
CPC ............ *H04W 72/02* (2013.01); *H04W 48/12* (2013.01); *H04W 72/042* (2013.01)

(58) Field of Classification Search
USPC ........................................................ 455/450
See application file for complete search history.

(56) References Cited

U.S. PATENT DOCUMENTS

| | | | |
|---|---|---|---|
| 9,628,243 B2* | 4/2017 | Zheng | H04L 5/0055 |
| 9,629,180 B2* | 4/2017 | Ma | H04W 74/04 |
| 2010/0054171 A1 | 3/2010 | Zhu et al. | |
| 2011/0195732 A1 | 8/2011 | Kim et al. | |
| 2012/0059935 A1 | 3/2012 | Patil et al. | |
| 2012/0269115 A1 | 10/2012 | Esteves et al. | |
| 2016/0205675 A1* | 7/2016 | Zhang | H04W 72/044 455/450 |
| 2016/0247109 A1* | 8/2016 | Scicluna | G06Q 10/06315 |
| 2016/0316375 A1* | 10/2016 | Li | H04W 72/1226 |
| 2016/0344575 A1* | 11/2016 | Gong | H04J 11/0053 |
| 2016/0345313 A1* | 11/2016 | Zhao | H04W 74/02 |

FOREIGN PATENT DOCUMENTS

| | | | | |
|---|---|---|---|---|
| CN | 103250452 A | | 8/2013 | |
| CN | WO 2015043465 A2 | * | 4/2015 | .......... H04W 72/044 |
| CN | WO 2015043465 A3 | * | 5/2015 | .......... H04W 72/044 |
| CN | EP 3038420 A2 | * | 6/2016 | .......... H04W 72/044 |
| EP | 2489230 A1 | | 8/2012 | |
| GB | 2499418 A | | 8/2013 | |
| WO | 2011130630 A1 | | 10/2011 | |

OTHER PUBLICATIONS

ZTE: "Discussion of D2D Discovery," 3GPP TSG-RAN WG1 #74, R1-133149, Aug. 19-23, 2013, pp. 1-10, Barcelona, Spain.

Intel Corporation: "Discussion on RAN2 Aspects of D2D Discovery," 3GPP TSG-RAN2 Meeting #83, R2-132823, Aug. 19-23, 2013, pp. 1-6, Barcelona, Spain.

Bao, P., et al., "Novel Frequency Reusing Scheme for Interference Mitigation in D2D Uplink Underlaying Networks," 2013 9th International Wireless Communications and Mobile Computing Conference (IWCMC), Jul. 1-5, 2013, pp. 491-496, Sardinia.

Chae, H.S., et al., "Radio Resource Allocation Scheme for Device-to-Device Communication in Cellular Networks Using Fractional Frequency Reuse," 17th Asia Pacific Conference on Communications, Oct. 2-5, 2011, pp. 58-62, Sabah.

* cited by examiner

BASE STATION RESOURCE ALLOCATION

This application is a continuation of International Application No. PCT/CN2014/087265, filed on Sep. 24, 2014, which claims priority to Chinese Patent Application No. 201310442052.X, filed on Sep. 25, 2013, both of which are hereby incorporated by reference in their entireties.

TECHNICAL FIELD

The present invention relates to the communications field, and in particular, to a resource allocation method, apparatus and system.

BACKGROUND

Proximity discovery is a technology for performing communication by using a characteristic that physical locations of at least two terminals are proximate. The proximity discovery is applied to many application scenarios. For example, the proximity discovery is used for discovering a nearby friend or a person having a same interest in a social network application, viewing what discount information is available nearby in an advertisement application, and searching for a nearby restaurant in a location-based service.

A discovery resource is a communications resource used for implementing proximity discovery. In an existing proximity discovery technology, a base station is generally used to broadcast information carrying a discovery resource, and then a user equipment acquires the discovery resource by listening to the information that is broadcast by the base station. However, when a collision between discovery resources of a cell changes, discovery performance may be affected, and therefore an entire utilization rate of the discovery resources is relatively low, where the discovery performance includes a discovery probability, a discovery delay, a discovery quantity within a unit distance and the like of a user equipment.

SUMMARY

Embodiments provide a resource allocation method, apparatus and system, which can improve an entire utilization rate of discovery resources.

To achieve the foregoing objective, the following technical solutions are provided in the embodiments.

According to a first aspect, a resource allocation method is provided. The method is used for a base station, and includes acquiring a current resource indication of a cell, and generating a resource adjustment indication according to the current resource indication of the cell. The resource adjustment indication is used for instructing a mobility management entity MME to adjust a discovery resource allocated to the cell. The method also includes generating a resource adjustment request, where the resource adjustment request includes the resource adjustment indication, and sending the resource adjustment request, so that the MME adjusts the discovery resource of the cell according to the resource adjustment request.

With reference to the first aspect, in a first implementable manner, the current resource indication is a quantity of resource collisions.

With reference to the first implementable manner, in a second implementable manner, the discovery resource of the cell includes discovery resources of at least two reuse factors.

With reference to the first implementable manner and the second implementable manner, in a third implementable manner, the discovery resource of the cell includes discovery resources of two reuse factors, the two reuse factors are a first reuse factor and a second reuse factor, the first reuse factor is greater than or equal to 6, and the second reuse factor is less than 6. The acquiring a current resource indication of a cell includes broadcasting a collision probability threshold, so that each user equipment reports a resource adjustment signal when a collision probability is greater than or equal to the collision probability threshold, receiving the resource adjustment signal sent by each user equipment, counting a quantity of the resource adjustment signals, and determining a current quantity of resource collisions in the cell according to the quantity of the resource adjustment signals. The current quantity of the resource collisions in the cell includes: a quantity of discovery resource collisions of the first reuse factor and a quantity of discovery resource collisions of the second reuse factor.

With reference to the third implementable manner, in a fourth implementable manner, the resource adjustment indication includes an indication for reducing a quantity of discovery resources of the first reuse factor or an indication for increasing a quantity of discovery resources of the first reuse factor. The generating a resource adjustment indication according to the current resource indication of the cell includes: when the quantity of the discovery resource collisions of the second reuse factor is greater than or equal to a second threshold, generating the indication for reducing a quantity of discovery resources of the first reuse factor; or when the quantity of the discovery resource collisions of the second reuse factor is less than a second threshold, generating the indication for increasing a quantity of discovery resources of the first reuse factor.

With reference to the first implementable manner to the fourth implementable manner, in a fifth implementable manner, after the sending the resource adjustment request, the method further includes: receiving a discovery resource sent by the MME; broadcasting a total set of current discovery resources of the cell, where the total set of the current discovery resources of the cell includes the discovery resources of the first reuse factor and discovery resources of the second reuse factor; receiving a resource application sent by the user equipment; and allocating the discovery resources to the user equipment according to an allocation priority. A priority of a corresponding discovery resource whose reuse factor is the second reuse factor and whose resource collision quantity is less than the second threshold is ranked first. A priority of a corresponding discovery resource whose reuse factor is the first reuse factor and whose resource collision quantity is less than a first threshold is ranked second. A priority of a corresponding discovery resource whose reuse factor is the first reuse factor and whose resource collision quantity is greater than or equal to the first threshold is ranked third. A priority of a corresponding discovery resource whose reuse factor is the second reuse factor and whose resource collision quantity is less than or equal to the second threshold is ranked fourth.

With reference to the first implementable manner to the fourth implementable manner, in a sixth implementable manner, after the sending the resource adjustment request, the method further includes: receiving a discovery resource sent by the MME, and broadcasting a total set of current discovery resources of the cell and a set of the discovery resources of the first reuse factor, so that the user equipment selects a discovery resource according to the total set of the discovery resources and the set of the discovery resources of the first reuse factor. The total set of the current discovery resources of the cell includes the discovery resources of the first reuse factor and discovery resources of the second reuse factor.

With reference to the first aspect, in a seventh implementable manner, the current resource indication is a resource utilization rate and a resource collision probability.

With reference to the seventh implementable manner, in an eighth implementable manner, the acquiring a current resource indication of a cell includes: acquiring energy of a discovery beacon frame of a user equipment; if the energy of the discovery beacon frame is greater than or equal to a first preset threshold, performing cyclic redundancy check CRC parsing on a time frequency block at which the discovery beacon frame is located; if the CRC parsing is performed correctly, marking the time frequency block at which the discovery beacon frame is located as occupation; if the CRC parsing is performed incorrectly, marking the time frequency block at which the discovery beacon frame is located as collision; acquiring a ratio of a quantity of the time frequency blocks marked as occupation to a total quantity of time frequency blocks to serve as the resource utilization rate; and acquiring a ratio of a quantity of the time frequency blocks marked as collision to the total quantity of the time frequency blocks to serve as the resource collision probability.

With reference to the seventh implementable manner and the eighth implementable manner, in a ninth implementable manner, the resource adjustment indication includes an indication for reducing a quantity of discovery resources or an indication for increasing a quantity of discovery resources. The generating a resource adjustment indication according to the current resource indication of the cell includes: if the resource utilization rate is less than a second preset threshold, generating the indication for reducing a quantity of discovery resources; and if the resource collision probability is greater than or equal to a third preset threshold, generating the indication for increasing a quantity of discovery resources.

With reference to the first aspect, and the first implementable manner to the ninth implementable manner, in a tenth implementable manner, the discovery resource includes at least one time frequency block.

According to a second aspect, a resource allocation method is provided. The method is used for a user equipment, and includes receiving a total set of current discovery resources of a cell and a set of discovery resources of a first reuse factor that are broadcast by a base station. The total set of the current discovery resources of the cell includes the discovery resources of the first reuse factor and discovery resources of a second reuse factor, the first reuse factor is greater than or equal to 6, and the second reuse factor is less than 6. The method also includes selecting a discovery resource according to the total set of the discovery resources and the set of the discovery resources of the first reuse factor.

With reference to the second aspect, in a first implementable manner, the selecting a discovery resource according to the total set of the discovery resources and the set of the discovery resources of the first reuse factor include: selecting all available discovery resources from the total set of the discovery resources according to a first preset rule, to form a discovery resource subset; calculating an intersection set of the discovery resource subset and the discovery resources of the first reuse factor to obtain a set of available resources; and selecting a discovery resource from the set of the available resources.

With reference to the second aspect and the first implementable manner, in a second implementable manner, the method further includes: acquiring a collision probability threshold that is broadcast by the base station; acquiring a collision probability of the user equipment; when the collision probability of the user equipment is greater than or equal to the collision probability threshold, generating a resource adjustment signal; and sending the resource adjustment signal to the base station, so that the base station counts a quantity of the resource adjustment signals, and determines a current quantity of resource collisions in the cell according to the quantity of the resource adjustment signals. The current quantity of the resource collisions in the cell includes: a quantity of discovery resource collisions of the first reuse factor and a quantity of discovery resource collisions of the second reuse factor.

With reference to the second aspect, and the first implementable manner and the second implementable manner, in a third implementable manner, the discovery resource includes at least one time frequency block.

According to a third aspect, a base station is provided, where the base station includes: an acquiring unit, configured to acquire a current resource indication of a cell; a first generating unit, configured to generate a resource adjustment indication according to the current resource indication of the cell acquired by the acquiring unit, where the resource adjustment indication is used for instructing a mobility management entity MME to adjust a discovery resource allocated to the cell. The base station also includes a second generating unit, configured to generate a resource adjustment request, where the resource adjustment request includes the resource adjustment indication generated by the first generating unit. The base station also includes a sending unit, configured to send the resource adjustment request generated by the second generating unit, so that the MME adjusts the discovery resource of the cell according to the resource adjustment request.

With reference to the third aspect, in a first implementable manner, the current resource indication is a quantity of resource collisions.

With reference to the first implementable manner, in a second implementable manner, the discovery resource of the cell includes discovery resources of at least two reuse factors.

With reference to the first implementable manner and the second implementable manner, in a third implementable manner, the discovery resource of the cell includes discovery resources of two reuse factors, the two reuse factors are a first reuse factor and a second reuse factor, the first reuse factor is greater than or equal to 6, and the second reuse factor is less than 6. The acquiring unit is specifically configured to: broadcast a collision probability threshold, so that each user equipment reports a resource adjustment signal when a collision probability is greater than or equal to the collision probability threshold; receive the resource adjustment signal sent by each user equipment; count a quantity of the resource adjustment signals; and determine a current quantity of resource collisions in the cell according to the quantity of the resource adjustment signals. The current quantity of the resource collisions in the cell includes: a quantity of discovery resource collisions of the first reuse factor and a quantity of discovery resource collisions of the second reuse factor.

With reference to the third implementable manner, in a fourth implementable manner, the resource adjustment indication includes an indication for reducing a quantity of discovery resources of the first reuse factor or an indication for increasing a quantity of discovery resources of the first reuse factor. The first generating unit is specifically configured to: when the quantity of the discovery resource collisions of the second reuse factor is greater than or equal to a second threshold, generate the indication for reducing a quantity of discovery resources of the first reuse factor; or when the quantity of the discovery resource collisions of the second reuse factor is less than a second threshold, generate the indication for increasing a quantity of discovery resources of the first reuse factor.

With reference to the first implementable manner to the fourth implementable manner, in a fifth implementable manner, the base station further includes: a first receiving unit, configured to receive a discovery resource sent by the MME; a first broadcast unit, configured to broadcast a total set of current discovery resources of the cell, where the total set of the current discovery resources of the cell includes the discovery resources of the first reuse factor and discovery resources of the second reuse factor; a second receiving unit, configured to receive a resource application sent by the user equipment; and a processing unit, configured to allocate the discovery resources to the user equipment according to an allocation priority. A priority of a corresponding discovery resource whose reuse factor is the second reuse factor and whose resource collision quantity is less than the second threshold is ranked first. A priority of a corresponding discovery resource whose reuse factor is the first reuse factor and whose resource collision quantity is less than a first threshold is ranked second. A priority of a corresponding discovery resource whose reuse factor is the first reuse factor and whose resource collision quantity is greater than or equal to the first threshold is ranked third. A priority of a corresponding discovery resource whose reuse factor is the second reuse factor and whose resource collision quantity is less than or equal to the second threshold is ranked fourth.

With reference to the first implementable manner to the fourth implementable manner, in a sixth implementable manner, the base station further includes: a third receiving unit, configured to receive a discovery resource sent by the MME; and a second broadcast unit, configured to broadcast a total set of current discovery resources of the cell and a set of the discovery resources of the first reuse factor, so that the user equipment selects a discovery resource according to the total set of the discovery resources and the set of the discovery resources of the first reuse factor. The total set of the current discovery resources of the cell includes the discovery resources of the first reuse factor and discovery resources of the second reuse factor.

With reference to the third aspect, in a seventh implementable manner, the current resource indication is a resource utilization rate and a resource collision probability.

With reference to the seventh implementable manner, in an eighth implementable manner, the acquiring unit is specifically configured to: acquire energy of a discovery beacon frame of the user equipment; if the energy of the discovery beacon frame is greater than or equal to a first preset threshold, perform cyclic redundancy check CRC parsing on a time frequency block at which the discovery beacon frame is located; if the CRC parsing is performed correctly, mark the time frequency block at which the discovery beacon frame is located as occupation; if the CRC parsing is performed incorrectly, mark the time frequency block at which the discovery beacon frame is located as collision; acquire a ratio of a quantity of the time frequency blocks marked as occupation to a total quantity of time frequency blocks to serve as the resource utilization rate; and acquire a ratio of a quantity of the time frequency blocks marked as collision to the total quantity of the time frequency blocks to serve as the resource collision probability.

With reference to the seventh implementable manner and the eighth implementable manner, in a ninth implementable manner, the resource adjustment indication includes an indication for reducing a quantity of discovery resources or an indication for increasing a quantity of discovery resources. The first generating unit is specifically configured to: if the resource utilization rate is less than a second preset threshold, generate the indication for reducing a quantity of discovery resources; and if the resource collision probability is greater than or equal to a third preset threshold, generate the indication for increasing a quantity of discovery resources.

With reference to the third aspect, and the first implementable manner to the ninth implementable manner, in a tenth implementable manner, the discovery resource includes at least one time frequency block.

According to a fourth aspect, a user equipment is provided. The user equipment includes: a receiving unit, configured to receive a total set of current discovery resources of a cell and a set of discovery resources of a first reuse factor that are broadcast by a base station, where the total set of the current discovery resources of the cell includes the discovery resources of the first reuse factor and discovery resources of a second reuse factor, the first reuse factor is greater than or equal to 6, and the second reuse factor is less than 6; and a processing unit, configured to select a discovery resource according to the total set of the discovery resources and the set of the discovery resources of the first reuse factor that are received by the receiving unit.

With reference to the fourth aspect, in a first implementable manner, the processing unit is specifically configured to: select all available discovery resources from the total set of the discovery resources according to a first preset rule, to form a discovery resource subset; calculate an intersection set of the discovery resource subset and the discovery resources of the first reuse factor to obtain a set of available resources; and select a discovery resource from the set of the available resources.

With reference to the fourth aspect and the first implementable manner, in a second implementable manner, the user equipment further includes: a first acquiring unit, configured to acquire a collision probability threshold that is broadcast by the base station; a second acquiring unit, configured to acquire a collision probability of the user equipment; a generating unit, when the collision probability of the user equipment is greater than or equal to the collision probability threshold, configured to generate a resource adjustment signal; and a sending unit, configured to send the resource adjustment signal to the base station, so that the base station counts a quantity of the resource adjustment signals, and determines a current quantity of resource collisions in the cell according to the quantity of the resource adjustment signals. The current quantity of the resource collisions in the cell includes: a quantity of discovery resource collisions of the first reuse factor and a quantity of discovery resource collisions of the second reuse factor.

With reference to the fourth aspect, and the first implementable manner and the second implementable manner, in a third implementable manner, the discovery resource includes at least one time frequency block.

According to a fifth aspect, a resource allocation system is provided, where the system includes: any base station described above; and any user equipment described above.

According to a sixth aspect, a base station is provided, where the base station includes: a processor, configured to:

acquire a current resource indication of a cell; generate a resource adjustment indication according to the current resource indication of the cell, where the resource adjustment indication is used for instructing a mobility management entity MME to adjust a discovery resource allocated to the cell; and generate a resource adjustment request, where the resource adjustment request includes the resource adjustment indication; and a transmitter, configured to send the resource adjustment request generated by the processor, so that the MME adjusts the discovery resource of the cell according to the resource adjustment request.

With reference to the sixth aspect, in a first implementable manner, the current resource indication is a quantity of resource collisions.

With reference to the first implementable manner, in a second implementable manner, the discovery resource of the cell includes discovery resources of at least two reuse factors.

With reference to the first implementable manner and the second implementable manner, in a third implementable manner, the discovery resource of the cell includes discovery resources of two reuse factors, the two reuse factors are a first reuse factor and a second reuse factor, the first reuse factor is greater than or equal to 6, and the second reuse factor is less than 6. The transmitter is specifically configured to: broadcast a collision probability threshold, so that each user equipment reports a resource adjustment signal when a collision probability is greater than or equal to the collision probability threshold; the base station further includes: a receiver, configured to receive the resource adjustment signal sent by each user equipment; and the processor is further configured to: count a quantity of the resource adjustment signals; and determine a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor.

With reference to the third implementable manner, in a fourth implementable manner, the resource adjustment indication includes an indication for reducing a quantity of discovery resources of the first reuse factor or an indication for increasing a quantity of discovery resources of the first reuse factor. The processor is further configured to: when the quantity of the discovery resource collisions of the second reuse factor is greater than or equal to a second threshold, generate the indication for reducing a quantity of discovery resources of the first reuse factor; or when the quantity of the discovery resource collisions of the second reuse factor is less than a second threshold, generate the indication for increasing a quantity of discovery resources of the first reuse factor.

With reference to the first implementable manner to the fourth implementable manner, in a fifth implementable manner, the receiver is further configured to receive a discovery resource sent by the MME. The transmitter is further configured to broadcast a total set of current discovery resources of the cell, where the total set of the current discovery resources of the cell includes the discovery resources of the first reuse factor and discovery resources of the second reuse factor. The receiver is further configured to receive a resource application sent by the user equipment. The processor is further configured to allocate the discovery resources to the user equipment according to an allocation priority. A priority of a corresponding discovery resource whose reuse factor is the second reuse factor and whose resource collision quantity is less than the second threshold is ranked first. A priority of a corresponding discovery resource whose reuse factor is the first reuse factor and whose resource collision quantity is less than a first threshold is ranked second. A priority of a corresponding discovery resource whose reuse factor is the first reuse factor and whose resource collision quantity is greater than or equal to the first threshold is ranked third. A priority of a corresponding discovery resource whose reuse factor is the second reuse factor and whose resource collision quantity is less than or equal to the second threshold is ranked fourth.

With reference to the first implementable manner to the fourth implementable manner, in a sixth implementable manner, the base station further includes: the receiver is further configured to receive a discovery resource sent by the MME; and the transmitter is further configured to broadcast a total set of current discovery resources of the cell and a set of the discovery resources of the first reuse factor, so that the user equipment selects a discovery resource according to the total set of the discovery resources and the set of the discovery resources of the first reuse factor, where the total set of the current discovery resources of the cell includes the discovery resources of the first reuse factor and discovery resources of the second reuse factor.

With reference to the sixth aspect, in a seventh implementable manner, the current resource indication is a resource utilization rate and a resource collision probability.

With reference to the seventh implementable manner, in an eighth implementable manner, the processor is further specifically configured to: acquire energy of a discovery beacon frame of the user equipment; if the energy of the discovery beacon frame is greater than or equal to a first preset threshold, perform cyclic redundancy check CRC parsing on a time frequency block at which the discovery beacon frame is located; if the CRC parsing is performed correctly, mark the time frequency block at which the discovery beacon frame is located as occupation; if the CRC parsing is performed incorrectly, mark the time frequency block at which the discovery beacon frame is located as collision; acquire a ratio of a quantity of the time frequency blocks marked as occupation to a total quantity of time frequency blocks to serve as the resource utilization rate; and acquire a ratio of a quantity of the time frequency blocks marked as collision to the total quantity of the time frequency blocks to serve as the resource collision probability.

With reference to the seventh implementable manner and the eighth implementable manner, in a ninth implementable manner, the resource adjustment indication includes an indication for reducing a quantity of discovery resources or an indication for increasing a quantity of discovery resources. The processor is specifically configured to: if the resource utilization rate is less than a second preset threshold, generate the indication for reducing a quantity of discovery resources; and if the resource collision probability is greater than or equal to a third preset threshold, generate the indication for increasing a quantity of discovery resources.

With reference to the sixth aspect, and the first implementable manner to the ninth implementable manner, in a tenth implementable manner, the discovery resource includes at least one time frequency block.

According to a seventh aspect, a user equipment is provided. The user equipment includes: a receiver, configured to receive a total set of current discovery resources of a cell and a set of discovery resources of a first reuse factor that are broadcast by a base station, where the total set of the current discovery resources of the cell includes the discovery resources of the first reuse factor and discovery resources of a second reuse factor, the first reuse factor is greater than or equal to 6, and the second reuse factor is less than 6. The user equipment also includes a processor, configured to select a discovery resource according to the total set of the discovery resources and the set of the discovery resources of the first reuse factor that are received by the receiver.

With reference to the seventh aspect, in a first implementable manner, the processor is specifically configured to: select all available discovery resources from the total set of the discovery resources according to a first preset rule, to form a discovery resource subset; calculate an intersection set of the discovery resource subset and the discovery resources of the first reuse factor to obtain a set of available resources; and select a discovery resource from the set of the available resources.

With reference to the seventh aspect and the first implementable manner, in a second implementable manner, the processor is further configured to: acquire a collision probability threshold that is broadcast by the base station; acquire a collision probability of the user equipment; and when the collision probability of the user equipment is greater than or equal to the collision probability threshold, generate a resource adjustment signal. The user equipment further includes: a transmitter, configured to send the resource adjustment signal to the base station, so that the base station counts a quantity of the resource adjustment signals, and determines a current quantity of resource collisions in the cell according to the quantity of the resource adjustment signals. The current quantity of the resource collisions in the cell includes: a quantity of discovery resource collisions of the first reuse factor and a quantity of discovery resource collisions of the second reuse factor.

With reference to the seventh aspect, and the first implementable manner and the second implementable manner, in a third implementable manner, the discovery resource includes at least one time frequency block.

According to an eighth aspect, a resource allocation system is provided, where the system includes: any base station described above; and any user equipment described above.

The embodiments provide a resource allocation method, apparatus and system, where the method includes: acquiring, by a base station, a resource indication according to a case in which a user equipment uses a discovery resource, and generating a resource adjustment request according to the current resource indication when a discovery resource of a cell cannot satisfy a requirement; sending the resource adjustment request to an MME; and re-allocating, by the MME, the discovery resource of the cell according to the resource adjustment request. Compared with the prior art, flexibility in allocating the discovery resource and an entire utilization rate of the discovery resource are improved, and discovery performance of the discovery resource is ensured.

BRIEF DESCRIPTION OF THE DRAWINGS

For a more complete understanding of the present invention, and the advantages thereof, reference is now made to the following descriptions taken in conjunction with the accompanying drawings, in which.

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
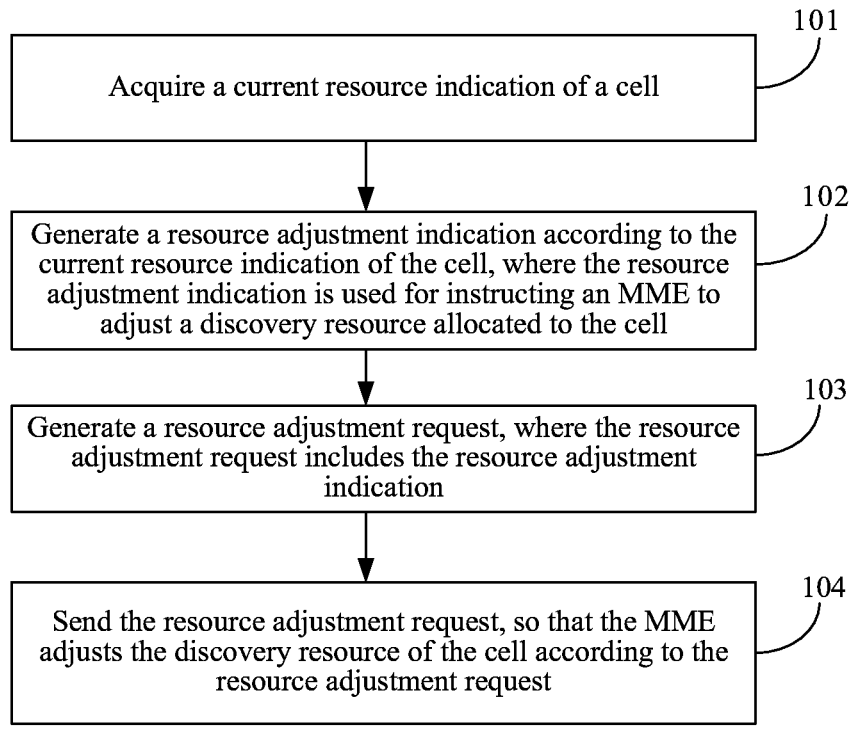
FIG. 1 is a flowchart of a resource allocation method according to an embodiment.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In a resource allocation system provided, multiple base stations are served by an MME (Mobility Management Entity), each base station manages a cell, and a discovery resource of the cell is allocated and adjusted by the MME. Exemplarily, when the MME performs initial allocation, the MME may allocate communications resources in consecutive eight frames in each 640 ms (milliseconds) to serve as discovery resources, that is, resources used for discovery in each 5120 ms is totally 64 frames; divide discovery resources in the 64 frames according to a time domain and a frequency domain into independent time frequency blocks, where in the frequency domain, each time frequency block occupies 180 kHz, and in the time domain, each time frequency block occupies 1 ms; and then number the time frequency blocks that are obtained by means of the dividing, where during the numbering, the numbering is performed according to a preset encoding rule, and the preset encoding rule may be the following numbering rule. For example, discovery resources in the zeroth frame are divided into 100 copies in the frequency domain, and then the 100 copies of discovery resources in the zeroth frame are numbered 0 to 99 in ascending order or in descending order according to frequencies; discovery resources in the first frame are divided into 100 copies in the frequency domain, each copy is referred to as one time frequency block, and then the discovery resources in the first frame are numbered 100 to 199 in descending order or in ascending order according to frequencies, and so on, and discovery resources in the sixty third frame are numbered 6300 to 6399 in descending order or in ascending order according to frequencies, that is, when the MME performs the initial allocation, a total set of discovery resources includes 6400 time frequency blocks. The total set of the discovery resources that is obtained by means of dividing according to the time domain and the frequency domain is divided again according to at least two reuse factors, where the reuse factor is a quantity of frequency channel numbers of a frequency reuse cluster. A larger reuse factor indicates a larger reuse distance. Exemplarily, when the total set of the discovery resources is divided again, the total set may be divided according to two reuse factors, that is, a first reuse factor and a second reuse factor, and the total set of the discovery resources is a sum of discovery resources of the first reuse factor and discovery resources of the second reuse factor, that is, a sum of a quantity of time frequency blocks of the discovery resources of the first reuse factor and a quantity of time frequency blocks of the discovery resources of the second reuse factor is 6400. When the total set of the discovery resources is divided again according to the first reuse factor and the second reuse factor, a quantity of the discovery resources of the first reuse factor is not allowed to exceed a half of a quantity of the discovery resources in the total set of the discovery resources, that is, the quantity of the time frequency blocks of the discovery resources of the first reuse factor cannot exceed 3200. The discovery resources are allocated to cells in the resource allocation system, and discovery resources of each cell include discovery resources of two reuse factors. Assuming that the first reuse factor is 9 and the second reuse factor is 3, resources of each cell whose reuse factor is 9 are ⅑ of all resources whose reuse factors are 9 in the total set of the discovery resources, and resources of each cell whose reuse factor is 3 are ⅓ of all resources whose reuse factors are 3 in the total set of the discovery resources.

An embodiment provides a resource allocation method, where the method is used for a base station, and as shown in FIG. 1, includes the following steps.

Step 101: Acquire a current resource indication of a cell.

The current resource indication may be a quantity of resource collisions, or may be a resource utilization rate and a resource collision probability.

When the current resource indication is a quantity of resource collisions, specifically, before the acquiring a current resource indication of a cell, a collision probability threshold is first broadcast, so that each user equipment reports a resource adjustment signal when a collision probability is greater than or equal to the collision probability threshold, where the collision probability threshold is a quantity of resource collisions in a unit time, and in an actual application, corresponding configuration may be performed according to different structures in a resource allocation system. Then, the resource adjustment signal sent by each user equipment is received and a quantity of the resource adjustment signals is counted. Finally, a current quantity of resource collisions in the cell is determined according to the quantity of the resource adjustment signals.

The discovery resource of the cell includes discovery resources of at least two reuse factors. The current quantity of the resource collisions in the cell includes: a quantity of discovery resource collisions of a first reuse factor and a quantity of discovery resource collisions of a second reuse factor. Discovery resources used by a user equipment are all allocated by a base station, and the base station records and saves an allocation result during allocation, and therefore, when detecting a resource collision, the base station determines, according to a local allocation record of the base station, whether the resource collision occurs in discovery resources of the first reuse factor or discovery resources of the second reuse factor, and then may count the quantity of the discovery resource collisions of the first reuse factor and the quantity of the discovery resource collisions of the second reuse factor.

When the current resource indication is a resource utilization rate and a resource collision probability, specifically, before the acquiring a current resource indication of a cell, a discovery beacon frame of a user equipment is first listened to, so as to acquire energy of the discovery beacon frame, and if the energy of the discovery beacon frame is less than a first preset threshold, a time frequency block at which the discovery beacon frame is located is marked as idleness; or if the energy of the discovery beacon frame is greater than or equal to a first preset threshold, CRC (Cyclic Redundancy Check) parsing is performed on a time frequency block at which the discovery beacon frame is located, where a method for the CRC parsing is the same as a method for CRC parsing in the prior art, and details are not described herein. If the CRC parsing is performed correctly, the time frequency block at which the discovery beacon frame is located is marked as occupation; if the CRC parsing is performed incorrectly, the time frequency block at which the discovery beacon frame is located is marked as collision. A ratio of a quantity of the time frequency blocks marked as occupation to a total quantity of time frequency blocks is acquired to serve as the resource utilization rate; and a ratio of a quantity of the time frequency blocks marked as collision to the total quantity of the time frequency blocks is acquired to serve as the resource collision probability.

Step 102: Generate a resource adjustment indication according to the current resource indication of the cell, where the resource adjustment indication is used for instructing an MME to adjust a discovery resource allocated to the cell.

Specifically, when the current resource indication is a resource collision probability, the resource adjustment indication includes an indication for reducing a quantity of discovery resources of the first reuse factor or an indication for increasing a quantity of discovery resources of the first reuse factor. When the quantity of the discovery resource collisions of the second reuse factor is greater than or equal to a second threshold, the indication for reducing a quantity of discovery resources of the first reuse factor is generated; or when the quantity of the discovery resource collisions of the second reuse factor is less than a second threshold, the indication for increasing a quantity of discovery resources of the first reuse factor is generated.

When the current resource indication is a resource utilization rate and a resource collision probability, the resource adjustment indication includes an indication for reducing a quantity of discovery resources or an indication for increasing a quantity of discovery resources. If the resource utilization rate is less than a second preset threshold, the indication for reducing a quantity of discovery resources is generated; and if the resource collision probability is greater than or equal to a third preset threshold, the indication for increasing a quantity of discovery resources is generated.

The second preset threshold and the third preset threshold may be set according to a specific situation of the resource allocation system. In this embodiment of the present invention, a resource indication is generated by separately setting thresholds for a resource utilization rate and a resource collision probability, so as to avoid a ping-pong effect at the time of adjusting discovery resources, and ensure stability of the discovery resources in the resource allocation system.

Step 103: Generate a resource adjustment request, where the resource adjustment request includes the resource adjustment indication.

Specifically, when the current resource indication is a resource collision probability, the generated resource adjustment request is a request for reducing a quantity of discovery resources of the first reuse factor or a request for increasing a quantity of discovery resources of the first reuse factor.

When the current resource indication is a resource utilization rate and a resource collision probability, the generated resource adjustment request is a request for reducing a quantity of discovery resources or a request for increasing a quantity of discovery resources.

Step 104: Send the resource adjustment request, so that the MME adjusts the discovery resource of the cell according to the resource adjustment request.

In this way, when a discovery resource of a cell cannot satisfy a requirement of a user equipment, a base station sends a resource adjustment request to an MME according to a collision situation of the discovery resource in the cell, so that the MME allocates the discovery resource of the cell according to the resource adjustment request. Compared with the prior art, flexibility in allocating the discovery resource and an entire utilization rate of the discovery resource are improved, and discovery performance of the discovery resource is ensured.

Further, after the MME adjusts the discovery resource of the cell according to the resource adjustment request, a current discovery resource of the cell that is obtained after adjustment is allocated, and during allocation, the base station may perform allocation actively, or the base station may perform allocation according to listening of the user equipment.

When the base station performs allocation actively, specifically, the base station receives a discovery resource sent by the MME, where the discovery resource is a resource that is obtained after adjustment performed by the MME according to the resource adjustment request.

A total set of the current discovery resources of the cell is broadcast, and then, a resource application sent by the user equipment is received. The base station allocates a discovery resource according to a discovery resource application request from the user equipment, and allocates the discovery resource to the user equipment according to a preset allocation rule during allocation. Exemplarily, the preset allocation rule may be: a threshold of a quantity of resource collisions of a discovery resource whose reuse factor is the first reuse factor is a first threshold, and a threshold of a quantity of resource collisions of a discovery resource whose reuse factor is the second reuse factor is the second threshold. The first threshold and the second threshold are separately preset according to a specific situation of the resource allocation system. When allocating the discovery resource to the user equipment, the base station allocates the discovery resource to the user equipment according to a preset priority, where the priority is as follows: a priority of a corresponding discovery resource whose reuse factor is the second reuse factor and whose resource collision quantity is less than the second threshold is ranked first, a priority of a corresponding discovery resource whose reuse factor is the first reuse factor and whose resource collision quantity is less than the first threshold is ranked second, a priority of a corresponding discovery resource whose reuse factor is the first reuse factor and whose resource collision quantity is greater than or equal to the first threshold is ranked third, and a priority of a corresponding discovery resource whose reuse factor is the second reuse factor and whose resource collision quantity is less than or equal to the second threshold is ranked fourth. It should be noted that, the MME adjusts the discovery resource of the cell according to the resource adjustment request, a new discovery resource may be obtained after adjustment by increasing a discovery resource or reducing a discovery resource on the basis of the original discovery resource of the cell. Before step 102, the base station counts a quantity of discovery resource collisions in the cell; after step 104, when the base station counts the quantity of resource collisions again, a quantity of resource collisions of a discovery resource that is in the new discovery resource and is the same as a discovery resource in the original discovery resource of the cell does not change, and if an increased discovery resource exists, a quantity of resource collisions of the increased discovery resource is marked as 0.

When the base station performs allocation according to listening of the user equipment, specifically, the base station receives a discovery resource sent by the MME, where the discovery resource is a resource that is obtained after adjustment performed by the MME according to the resource adjustment request; and broadcasts a total set of current discovery resources of the cell and a set of discovery resources whose reuse factors are the first reuse factor, so that the user equipment selects a discovery resource according to the total set of the discovery resources and the discovery resources of the first reuse factor, where the total set of the discovery resources includes time frequency blocks of the discovery resources, and the set of the discovery resources whose reuse factors are the first reuse factor includes time frequency blocks of the discovery resources whose reuse factors are the first reuse factor. Exemplarily, a base station A may indicate the total set of the current discovery resources by broadcasting start numbers and lengths of the time frequency blocks of the total set of the current discovery resources of the cell, and indicate the set of the discovery resources of the first reuse factor by broadcasting start numbers and lengths of the time frequency blocks of the discovery resources of the first reuse factor. The user equipment listens to broadcast of the base station, determines, according to the total set of the current discovery resources of the cell and the set of the discovery resources whose reuse factors are the first reuse factor that are broadcast, a discovery resource that the user equipment needs to select, and then sends a resource application request; and then the base station allocates the discovery resource to the user equipment according to the resource application request.

The total set of the current discovery resources of the cell includes the discovery resources of the first reuse factor and discovery resources of the second reuse factor, that is, all current time frequency blocks of the cell include the time frequency blocks of the discovery resources of the first reuse factor and time frequency blocks of the discovery resources of the second reuse factor.

Figure 2:
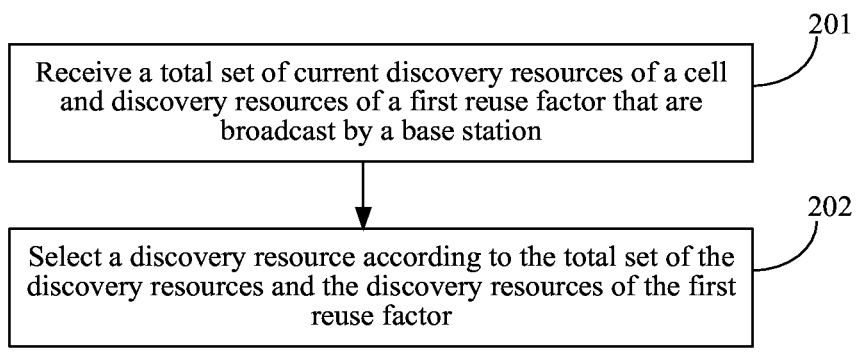
FIG. 2 is a flowchart of another resource allocation method according to an embodiment.

An embodiment provides a resource allocation method, where the method is used for a user equipment, and as shown in FIG. 2, includes the following steps.

Step 201: Receive a total set of current discovery resources of a cell and a set of discovery resources of a first reuse factor that are broadcast by a base station, where the total set of the current discovery resources of the cell includes the discovery resources of the first reuse factor and discovery resources of a second reuse factor, the first reuse factor is greater than or equal to 6, and the second reuse factor is less than 6.

Step 202: Select a discovery resource according to the total set of the discovery resources and the set of the discovery resources of the first reuse factor.

After the total set of the current discovery resources of the cell and the set of the discovery resources of the first reuse factor that are broadcast by the base station are received, available discovery resources are first selected from the total set of the current discovery resources of the cell according to a first preset rule, the selected discovery resources form a discovery resource subset, and the first preset rule may be configured according to a specific situation of a resource allocation system, for example, a discovery resource with minimum energy is selected from the total set of the current discovery resources of the cell. Then, an intersection set of the discovery resource subset and the set, which is broadcast by the base station, of the discovery resources of the first reuse factor is calculated to obtain a set of available resources. When a discovery resource is selected, the discovery resource is preferably selected from the set of the available resources, and when the discovery resource in the set of the available resources cannot satisfy a requirement of the user equipment, an additional weight is given to the discovery resource in the set of the available resources during selection, and a probability of selecting the discovery resource in the set of the available resources is greater than a probability of selecting another discovery resource during selection. For example, an additional 1.5 times of weight is given to the discovery resource in the set of the available resources, that is, the probability of selecting the discovery resource in the set of the available resources is greater than the probability of selecting another discovery resource by 1.5 times during selection.

In this way, a user equipment listens to broadcast of a base station, obtains a set of available resources according to a total set of current discovery resources of a cell and a set of discovery resources whose reuse factors are a first reuse factor that are broadcast, and preferably selects a discovery resource in the set of the available resources, and therefore flexibility in discovery resource allocation is improved.

Further, before step 201, a collision probability threshold that is broadcast by the base station may be first acquired, and then a collision probability of the user equipment is detected, where the collision probability threshold is a quantity of resource collisions in a unit time; when the collision probability of the user equipment is greater than or equal to the collision probability threshold, the user equipment generates a resource adjustment signal; and sends the resource adjustment signal to the base station, so that the base station counts a quantity of the resource adjustment signals, and determines a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor. In this way, when a discovery resource of a cell cannot satisfy a requirement, a user equipment sends a resource adjustment signal to a base station, so that the base station sends a resource adjustment request to an MME according to the resource adjustment signal, and then the MME re-allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 3:
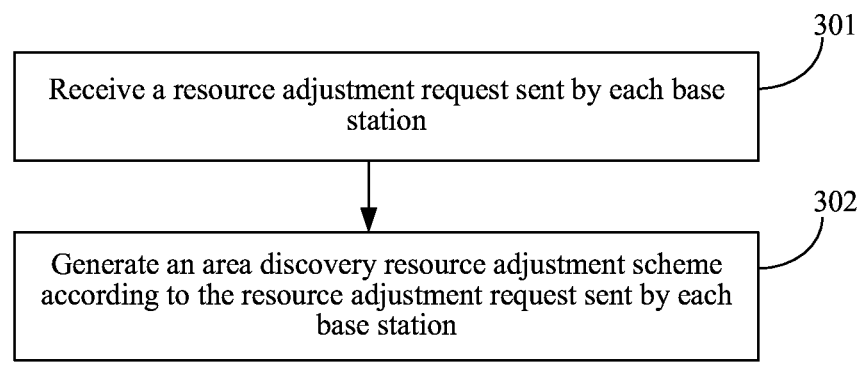
FIG. 3 is a flowchart of still another resource allocation method according to an embodiment.

An embodiment provides a resource allocation method, where the method is used for an MME, and as shown in FIG. 3, includes the following steps.

Step 301: Receive a resource adjustment request sent by each base station.

In a resource allocation system, one MME manages multiple base stations, and when a discovery resource of a cell cannot satisfy a requirement of a user equipment, each base station may send a resource adjustment request to the MME.

Specifically, a resource indication acquired by the base station may be a quantity of resource collisions, or may be a resource utilization rate and a resource collision probability. When the current resource indication is a quantity of resource collisions, the resource adjustment request received by the MME is a request for reducing a quantity of discovery resources of a first reuse factor or a request for increasing a quantity of discovery resources of a first reuse factor.

When the current resource indication is a resource utilization rate and a resource collision probability, the resource adjustment request received by the MME is a request for reducing a quantity of discovery resources or a request for increasing a quantity of discovery resources.

Step 302: Adjust a discovery resource according to the resource adjustment request sent by each base station.

Specifically, when the received resource adjustment request is the request for reducing a quantity of discovery resources of the first reuse factor or the request for increasing a quantity of discovery resources of the first reuse factor, a total quantity of time frequency blocks in a total set of discovery resources does not change, and only a quantity of time frequency blocks of the discovery resources of the first reuse factor is adjusted. If the received resource adjustment request is the request for reducing a quantity of discovery resources of the first reuse factor, the quantity of the time frequency blocks of the discovery resources of the first reuse factor is reduced, and a quantity of time frequency blocks of discovery resources of a second reuse factor is correspondingly increased; or if the received resource adjustment request is the request for increasing a quantity of discovery resources of the first reuse factor, the quantity of the time frequency blocks of the discovery resources of the first reuse factor is increased, and a quantity of time frequency blocks of discovery resources of a second reuse factor is correspondingly reduced, but the quantity of the time frequency blocks of the discovery resources of the first reuse factor is not allowed to exceed a half of a total quantity of time frequency blocks of discovery resources in an area.

When the received resource adjustment request is the request for reducing a quantity of discovery resources or the request for increasing a quantity of discovery resources, the total quantity of the time frequency blocks of the discovery resources in the area is adjusted. If the received resource adjustment request is the request for reducing a quantity of discovery resources, the total set of the discovery resources is reduced. For example, during initialization, the MME may allocate communications resources in consecutive eight frames in each 640 ms (milliseconds) to serve as discovery resources, and after adjustment, may allocate communications resources in consecutive four frames in each 640 ms to serve as discovery resources, where a bandwidth occupied by each frame does not change; in this way, resources in a time domain are correspondingly reduced, and therefore the total set of the discovery resources is reduced. Alternatively, the MME may allocate communications resources in consecutive eight frames in each 640 ms to serve as discovery resources, and a bandwidth occupied by each frame is reduced; in this way, resources in a frequency domain are correspondingly reduced, and therefore the total set of the discovery resources is reduced. In an actual application, to reduce half-duplex and near-far effects, in a case of satisfying a power consumption requirement, the resources in the frequency domain may be preferably reduced, and then the resources in the time domain are adjusted. If the received resource adjustment request is the request for increasing a quantity of discovery resources, resources allocated to the area and used for discovery are increased. For example, during initialization, the MME may allocate communications resources in consecutive eight frames in each 640 ms to serve as discovery resources, and after adjustment, may allocate communications resources in consecutive twelve frames in each 640 ms to serve as discovery resources, where a bandwidth occupied by each frame does not change; in this way, resources in a time domain are correspondingly increased, and therefore the total set of the discovery resources is increased. Alternatively, the MME may allocate communications resources in consecutive eight frames in each 640 ms to serve as discovery resources, and a bandwidth occupied by each frame is increased; in this way, resources in a frequency domain are correspondingly increased, and therefore the total set of the discovery resources is increased. In an actual application, to reduce half-duplex and near-far effects, in a case of satisfying a power consumption requirement, the resources in the time domain may be preferably increased, and then the resources in the frequency domain are adjusted.

In this way, when a discovery resource of a cell cannot satisfy a requirement of a user equipment, a base station sends a resource adjustment request to an MME according to a collision situation of the discovery resource in the cell. The MME re-allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 4:
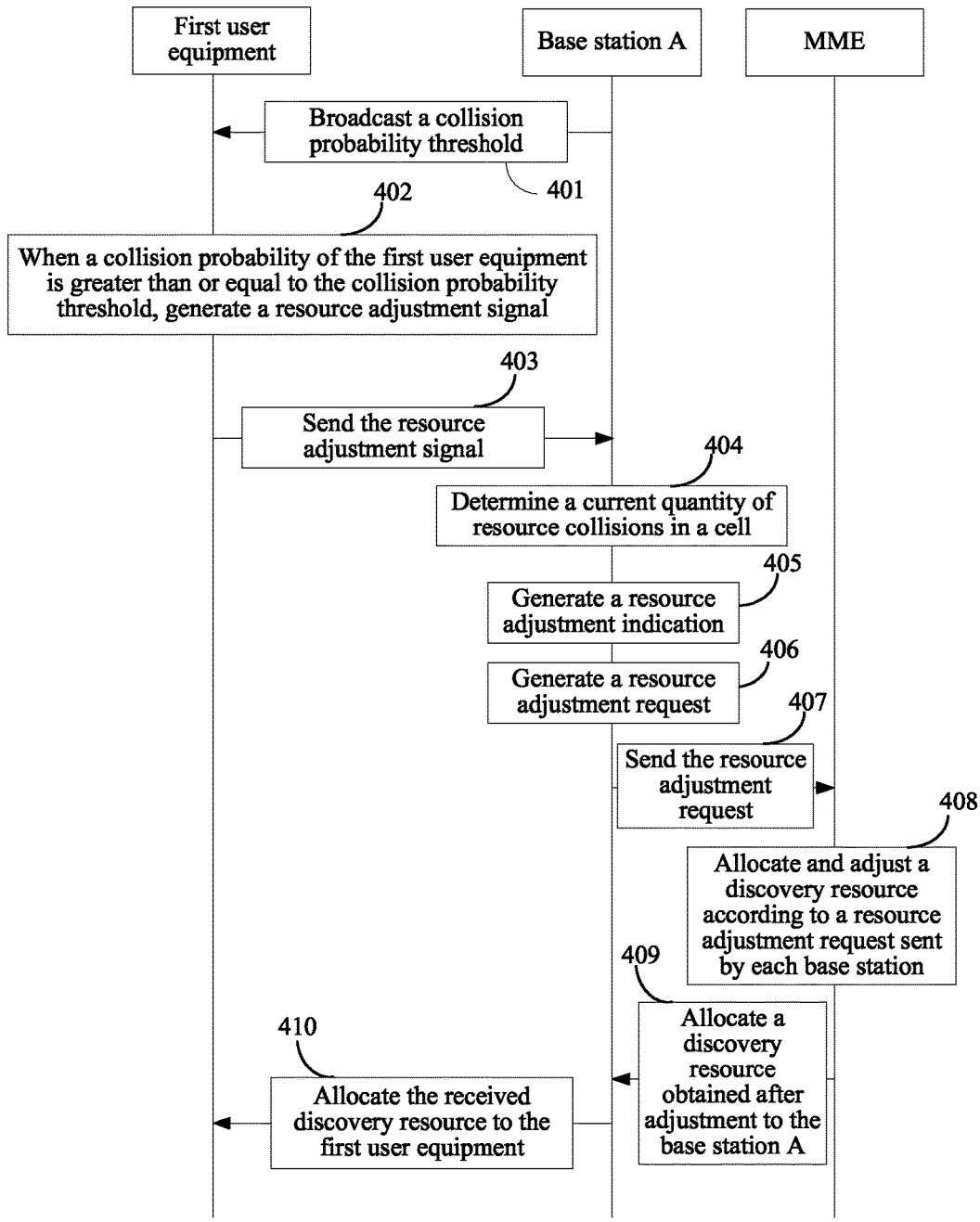
FIG. 4 is a flowchart of yet another resource allocation method according to an embodiment.

An embodiment provides a resource allocation method. As shown in FIG. 4, a base station A and a first user equipment are used as an example. Assuming that the base station A is a base station of a current cell at which the first user equipment is located, an MME manages the base station A, a current resource indication of the cell is a quantity of resource collisions, and discovery resources include discovery resources of at least two reuse factors.

Step 401: The base station A broadcasts a collision probability threshold to the first user equipment.

The collision probability threshold is a quantity of resource collisions in a unit time, and may be configured according to a specific situation of a resource allocation system in an actual application.

Step 402: When a collision probability of the first user equipment is greater than or equal to the collision probability threshold, the first user equipment generates a resource adjustment signal.

The first user equipment acquires the collision probability threshold that is broadcast by the base station A, detects the collision probability of the first user equipment, and determines whether the collision probability is greater than or equal to the collision probability threshold.

The resource adjustment signal is used for indicating that a current discovery resource of the cell cannot satisfy a requirement of the first user equipment and the current discovery resource needs to be adjusted.

Step 403: The first user equipment reports the resource adjustment signal to the base station A.

The first user equipment sends the resource adjustment signal to the base station A, so that the base station A counts a quantity of the resource adjustment signals, and determines a current quantity of resource collisions in the cell according to the quantity of the resource adjustment signals, where the current quantity of the resource collisions in the cell includes: a quantity of discovery resource collisions of a first reuse factor and a quantity of discovery resource collisions of a second reuse factor.

Step 404: The base station A determines a current quantity of resource collisions in the cell.

After receiving resource adjustment signals sent by user equipments, the base station A counts a quantity of the resource adjustment signals sent by the user equipments, and determines the current quantity of the resource collisions in the cell according to the quantity of the resource adjustment signals, where the current quantity of the resource collisions in the cell includes: the quantity of the discovery resource collisions of the first reuse factor and the quantity of the discovery resource collisions of the second reuse factor. Discovery resources used by a user equipment are all allocated by a base station, and the base station records and saves an allocation result during allocation, and therefore, when detecting a resource collision, the base station determines, according to a local allocation record of the base station, whether the resource collision occurs in discovery resources of the first reuse factor or discovery resources of the second reuse factor, and then may count the quantity of the discovery resource collisions of the first reuse factor and the quantity of the discovery resource collisions of the second reuse factor.

Step 405: The base station A generates a resource adjustment indication according to the current quantity of the resource collisions in the cell.

The resource adjustment indication includes an indication for reducing a quantity of discovery resources of the first reuse factor or an indication for increasing a quantity of discovery resources of the first reuse factor. When the quantity of the discovery resource collisions of the second reuse factor is greater than or equal to a second threshold, the indication for reducing a quantity of discovery resources of the first reuse factor is generated; or when the quantity of the discovery resource collisions of the second reuse factor is less than a second threshold, the indication for increasing a quantity of discovery resources of the first reuse factor is generated.

Step 406: The base station A generates a resource adjustment request according to the resource adjustment indication.

When the resource adjustment indication is the indication for reducing a quantity of discovery resources of the first reuse factor, a resource adjustment request including the indication for reducing a quantity of discovery resources of the first reuse factor is generated, that is, the resource adjustment request is a request for reducing a quantity of discovery resources of the first reuse factor; or when the resource adjustment indication is the indication for increasing a quantity of discovery resources of the first reuse factor, a resource adjustment request including the indication for increasing a quantity of discovery resources of the first reuse factor is generated, that is, the resource adjustment request is a request for increasing a quantity of discovery resources of the first reuse factor.

Step 407: The base station A sends the resource adjustment request to the MME.

The resource adjustment request includes the request for reducing a quantity of discovery resources of the first reuse factor or the request for increasing a quantity of discovery resources of the first reuse factor.

Step 408: The MME allocates and adjusts a discovery resource according to a resource adjustment request sent by each base station.

After receiving the resource adjustment request sent by each base station, the MME determines a resource adjustment scheme according to the resource adjustment request. Specifically, when the resource adjustment request received by the MME is the request for reducing a quantity of discovery resources of the first reuse factor or the request for increasing a quantity of discovery resources of the first reuse factor, a total quantity of time frequency blocks in a total set of discovery resources does not change, and only a quantity of time frequency blocks of the discovery resources of the first reuse factor is adjusted. If the received resource adjustment request is the request for reducing a quantity of discovery resources of the first reuse factor, the quantity of the time frequency blocks of the discovery resources of the first reuse factor is reduced, and a quantity of time frequency blocks of discovery resources of the second reuse factor is correspondingly increased; or if the received resource adjustment request is the request for increasing a quantity of discovery resources of the first reuse factor, the quantity of the time frequency blocks of the discovery resources of the first reuse factor is increased, and a quantity of time frequency blocks of discovery resources of the second reuse factor is correspondingly reduced, but the quantity of the time frequency blocks of the discovery resources of the first reuse factor is not allowed to exceed a half of a total quantity of time frequency blocks of discovery resources in an area. It should be noted that, the total set of the discovery resources include the discovery resources of the first reuse factor and the discovery resources of the second reuse factor, and the total set of the discovery resources includes multiple time frequency blocks.

Step 409: The MME allocates a discovery resource obtained after adjustment to the base station A.

Step 410: The base station A allocates the received discovery resource to the first user equipment.

After the base station A receives the discovery resource obtained after adjustment and sent by the MME, the base station A allocates the discovery resource obtained after adjustment, and during allocation, the base station may perform allocation actively, or the base station may perform allocation according to listening of the user equipment.

When the base station performs allocation actively, specifically, the base station A broadcasts a total set of current discovery resources of the cell, where the total set of the discovery resources includes time frequency blocks of the discovery resources. Exemplarily, start numbers and lengths of the time frequency blocks of the current discovery resources of the cell may be indicated during broadcast, a total broadcast format occupies 16 bits, the first 10 bits indicate the start numbers of the time frequency blocks of the current discovery resources of the cell, the last 6 bits indicate the lengths of the time frequency blocks of the current discovery resources of the cell, and a length of each time frequency block is 1. For example, a digital indicated by the last 6 bits of the total broadcast format is 8, to indicate that a quantity of the time frequency blocks of the current discovery resources of the cell is 8. The total set of the current discovery resources of the cell, that is, the current time frequency blocks of the cell include the discovery resources of the first reuse factor and the discovery resources of the second reuse factor.

Then, a resource application sent by the first user equipment is received, and generally, the first user equipment triggers application in three cases, where these three cases are as follows: initial application, authorization expiry, and a collision probability of the user equipment being higher than a collision probability threshold. During initial application, the first user equipment unconditionally applies for the current discovery resources of the cell; during authorization expiry, because usage time is preset for a discovery resource allocated to the user equipment by the base station, such as 20 s, when the usage time of the discovery resource allocated to the first user equipment expires, application is triggered again; and when the collision probability of the first user equipment is higher than the collision probability threshold, application is triggered again.

The base station A allocates the discovery resource according to the application of the first user equipment, and allocates the discovery resource to the first user equipment according to a preset allocation rule during allocation. Exemplarily, a threshold of a quantity of resource collisions of a discovery resource whose reuse factor is the first reuse factor is a first threshold, and a threshold of a quantity of resource collisions of a discovery resource whose reuse factor is the second reuse factor is the second threshold. When the discovery resource is allocated to the first user equipment, the discovery resource is allocated to the user equipment according to a preset priority, where the priority is as follows: a priority of a corresponding discovery resource whose reuse factor is the second reuse factor and whose resource collision quantity is less than the second threshold is ranked first, a priority of a corresponding discovery resource whose reuse factor is the first reuse factor and whose resource collision quantity is less than the first threshold is ranked second, a priority of a corresponding discovery resource whose reuse factor is the first reuse factor and whose resource collision quantity is greater than or equal to the first threshold is ranked third, and a priority of a corresponding discovery resource whose reuse factor is the second reuse factor and whose resource collision quantity is less than or equal to the second threshold is ranked fourth. For example, assuming that the first reuse factor is 9 and the second reuse factor is 3, a threshold of a quantity of resource collisions of a discovery resource whose reuse factor is 9 is the first threshold, and a threshold of a quantity of resource collisions of a discovery resource whose reuse factor is 3 is the second threshold; a discovery resource whose reuse factor is 3 and whose resource collision quantity is less than the second threshold is marked as A1, a discovery resource whose reuse factor is 3 and whose resource collision quantity is greater than or equal to the second threshold is marked as A2, a discovery resource whose reuse factor is 9 and whose resource collision quantity is less than the first threshold is marked as B1, and a discovery resource whose reuse factor is 9 and whose resource collision quantity is greater than or equal to the first threshold is marked as B2; and then, priorities of allocating the discovery resource are: A1 is ranked first, B1 is ranked second, B2 is ranked third, and A2 is ranked fourth.

It should be noted that, the MME adjusts the discovery resource of the cell according to the resource adjustment request, a new discovery resource may be obtained after adjustment by increasing a discovery resource or reducing a discovery resource on the basis of the original discovery resource of the cell; in step 404, the base station counts a quantity of discovery resource collisions in the cell; in this step, when the base station counts the quantity of resource collisions again, a quantity of resource collisions of a discovery resource that is in the new discovery resource and is the same as a discovery resource in the original discovery resource of the cell does not change, and if an increased discovery resource exists, a quantity of resource collisions of the increased discovery resource is marked as 0.

When the base station performs allocation according to listening of the user equipment, specifically, the base station A broadcasts a total set of current discovery resources of the cell and a set of discovery resources whose reuse factors are the first reuse factor, so that the first user equipment selects a discovery resource according to the total set of the discovery resources and the discovery resources of the first reuse factor, where the total set of the discovery resources includes time frequency blocks of the discovery resources, and the set of the discovery resources whose reuse factors are the first reuse factor includes time frequency blocks of the discovery resources whose reuse factors are the first reuse factor. Exemplarily, the base station A may indicate the total set of the current discovery resources by broadcasting start numbers and lengths of the time frequency blocks of the total set of the current discovery resources of the cell, and indicate the set of the discovery resources of the first reuse factor by broadcasting start numbers and lengths of the time frequency blocks of the discovery resources of the first reuse factor. A total broadcast format may occupy 32 bits, where the first 16 bits indicate start numbers and lengths of the time frequency blocks of the total set of the current discovery resources of the cell, and the last 16 bits indicate start numbers and lengths of the time frequency blocks of the discovery resources whose reuse factors are the first reuse factor. The user equipment listens to broadcast of the base station, determines, according to the total set of the current discovery resources of the cell and the set of the discovery resources whose reuse factors are the first reuse factor that are broadcast, a discovery resource that the user equipment needs to select, and then sends a resource application request; and then the base station allocates the discovery resources to the user equipment according to the resource application request.

After receiving the total set of the current discovery resources of the cell and the set of the discovery resources of the first reuse factor that are broadcast by the base station, the first user equipment first selects available discovery resources from the total set of the current discovery resources of the cell according to a first preset rule, where the selected discovery resources form a discovery resource subset, and the first preset rule may be configured according to different systems and solutions, for example, a discovery resource with minimum energy is selected from the total set of the current discovery resources of the cell. Then, an intersection set of the discovery resource subset and the set, which is broadcast by the base station, of the discovery resources of the first reuse factor is calculated to obtain a set of available resources. When a discovery resource is selected, the discovery resource is preferably selected from the set of the available resources, and when the discovery resource in the set of the available resources cannot satisfy a requirement of the user equipment, an additional weight is given to the discovery resource in the set of the available resources during selection, and a probability of selecting the discovery resource in the set of the available resources is greater than a probability of selecting another discovery resource during selection. For example, an additional 1.5 times of weight is given to the discovery resource in the set of the available resources, that is, the probability of selecting the discovery resource in the set of the available resources is greater than the probability of selecting another discovery resource by 1.5 times during selection.

In this way, when a discovery resource of a cell cannot satisfy a requirement of a user equipment, the user equipment sends a resource adjustment signal to a base station; the base station sends a resource adjustment request to an MME according to the resource adjustment signal; and the MME allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 5:
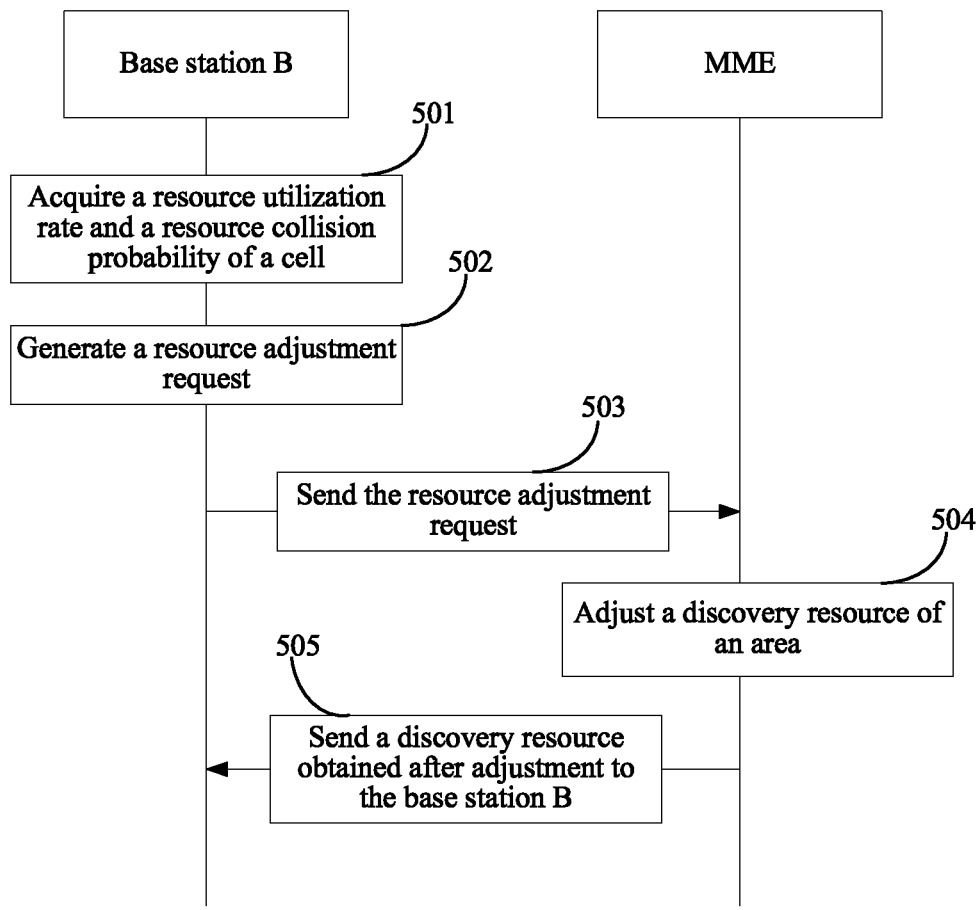
FIG. 5 is a flowchart of still yet another resource allocation method according to an embodiment.

Embodiments provide a resource allocation method. As shown in FIG. 5, a base station B is used as an example, an MME manages the base station B, and it is assumed that a current resource indication of a cell is a resource utilization rate and a resource collision probability.

Step 501: The base station B acquires a resource utilization rate and a resource collision probability of the cell.

Specifically, before the acquiring a current resource utilization rate and resource collision probability of the cell, the base station B first listens to a discovery beacon frame of a user equipment, acquires energy of the discovery beacon frame, and if the energy of the discovery beacon frame is less than a first preset threshold, marks a time frequency block at which the discovery beacon frame is located as idleness; or if the energy of the discovery beacon frame is greater than or equal to a first preset threshold, performs cyclic redundancy check CRC parsing on a time frequency block at which the discovery beacon frame is located, where the cyclic redundancy check CRC parsing is the same as a cyclic redundancy check CRC parsing technology in the prior art, and details are not described herein. If the CRC parsing is performed correctly, the time frequency block at which the discovery beacon frame is located is marked as occupation; if the CRC parsing is performed incorrectly, the time frequency block at which the discovery beacon frame is located is marked as collision. The base station B acquires a ratio of a quantity of the time frequency blocks marked as occupation to a total quantity of time frequency blocks to serve as the resource utilization rate; and acquires a ratio of a quantity of the time frequency blocks marked as collision to the total quantity of the time frequency blocks to serve as the resource collision probability.

Step 502: The base station B generates a resource adjustment request according to the resource utilization rate and the resource collision probability.

The base station B acquires the resource utilization rate and the resource collision probability of the cell, and therefore the generated resource adjustment request is a request for reducing a quantity of discovery resources or a request for increasing a quantity of discovery resources.

Step 503: The base station B sends the resource adjustment request to the MME.

Step 504: The MME adjusts a discovery resource according to the resource adjustment request.

In a resource allocation system, one MME manages multiple base stations, and when a discovery resource of a cell cannot satisfy a requirement of a user equipment, each base station may send a resource adjustment request to the MME.

When the resource adjustment request received by the MME is the request for reducing a quantity of discovery resources or the request for increasing a quantity of discovery resources, a total quantity of time frequency blocks of discovery resources in an area is adjusted. If the received resource adjustment request is the request for reducing a quantity of discovery resources, resources allocated to the area and used for discovery are reduced. For example, during initialization, the MME may allocate communications resources in consecutive eight frames in each 640 ms (milliseconds) to serve as discovery resources, and after adjustment, may allocate communications resources in consecutive four frames in each 640 ms to serve as discovery resources, where a bandwidth occupied by each frame does not change; in this way, resources in a time domain are correspondingly reduced, and therefore the total set of the discovery resources is reduced. Alternatively, the MME may allocate communications resources in consecutive eight frames in each 640 ms to serve as discovery resources, and a bandwidth occupied by each frame is reduced; in this way, resources in a frequency domain are correspondingly reduced, and therefore the total set of the discovery resources is reduced. In an actual application, to reduce half-duplex and near-far effects, in a case of satisfying a power consumption requirement, the resources in the frequency domain may be preferably reduced, and then the resources in the time domain are adjusted. If the received resource adjustment request is the request for increasing a quantity of discovery resources, resources allocated to the area and used for discovery are increased. For example, during initialization, the MME may allocate communications resources in consecutive eight frames in each 640 ms to serve as discovery resources, and after adjustment, may allocate communications resources in consecutive twelve frames in each 640 ms to serve as discovery resources, where a bandwidth occupied by each frame does not change; in this way, resources in a time domain are correspondingly increased, and therefore the total set of the discovery resources is increased. Alternatively, the MME may allocate communications resources in consecutive eight frames in each 640 ms to serve as discovery resources, and a bandwidth occupied by each frame is increased; in this way, resources in a frequency domain are correspondingly increased, and therefore the total set of the discovery resources is increased. In an actual application, to reduce half-duplex and near-far effects, in a case of satisfying a power consumption requirement, the resources in the time domain may be preferably increased, and then the resources in the frequency domain are adjusted.

Step 505: The MME allocates a discovery resource obtained after adjustment to the base station B.

This embodiment of the present invention provides a resource allocation method, where a base station acquires a resource indication according to a case in which a user equipment uses discovery resources, and sends a resource adjustment request to an MME according to the current resource indication when a discovery resource of a cell cannot satisfy a requirement; and the MME re-allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 6:
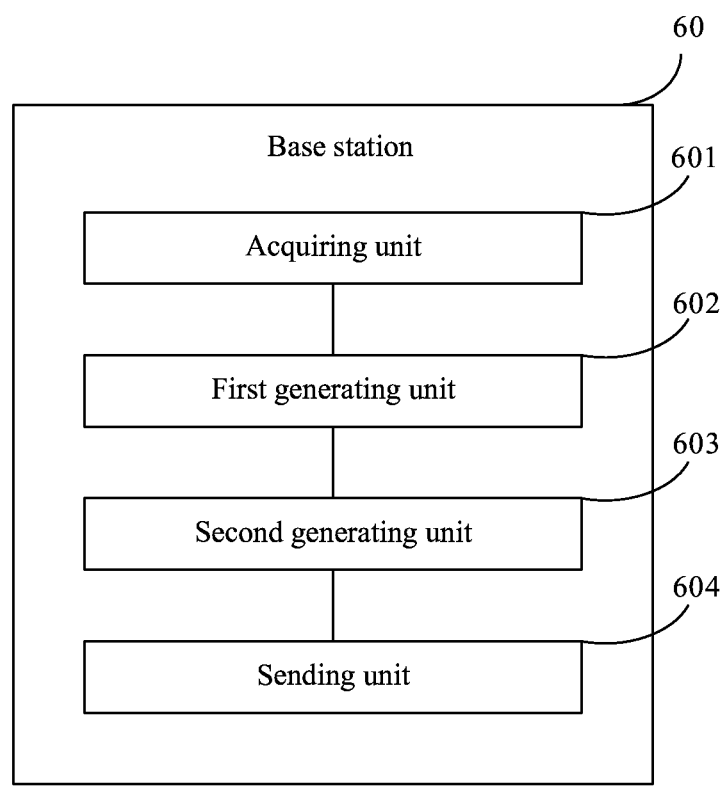
FIG. 6 is a schematic structural diagram of a base station according to an embodiment.

An embodiment provides a base station 60, as shown in FIG. 6, including: an acquiring unit 601, configured to acquire a current resource indication of a cell; a first generating unit 602, configured to generate a resource adjustment indication according to the current resource indication of the cell acquired by the acquiring unit 601, where the resource adjustment indication is used for instructing a mobility management entity MME to adjust a discovery resource allocated to the cell; a second generating unit 603, configured to generate a resource adjustment request, where the resource adjustment request includes the resource adjustment indication generated by the first generating unit 602; and a sending unit 604, configured to send the resource adjustment request generated by the second generating unit 603, so that the MME adjusts the discovery resource of the cell according to the resource adjustment request.

In this way, when a discovery resource of a cell cannot satisfy a requirement of a user equipment, an acquiring unit of a base station acquires a current resource indication of the cell according to a collision situation of the discovery resources in the current cell; a generating unit generates a resource adjustment indication according to the current resource indication of the cell acquired by the acquiring unit; and a sending unit sends a resource adjustment request to an MME, so that the MME allocates the discovery resource of the cell according to the resource adjustment request. Compared with the prior art, flexibility in allocating the discovery resource and an entire utilization rate of the discovery resource are improved, and discovery performance of the discovery resource is ensured.

The current resource indication may be a quantity of resource collisions, or may be a resource utilization rate and a resource collision probability. When the current resource indication is a quantity of resource collisions, the resource adjustment indication includes an indication for reducing a quantity of discovery resources of a first reuse factor or an indication for increasing a quantity of discovery resources of a first reuse factor; or when the current resource indication is a resource utilization rate and a resource collision probability, the resource adjustment indication includes an indication for reducing a quantity of discovery resources or an indication for increasing a quantity of discovery resources.

When the current resource indication is the quantity of resource collisions, the discovery resource of the cell includes discovery resources of at least two reuse factors. The two reuse factors are the first reuse factor and a second reuse factor, the first reuse factor is greater than or equal to 6, and the second reuse factor is less than 6.

The acquiring unit 601 is specifically configured to: broadcast a collision probability threshold, so that each user equipment reports a resource adjustment signal when a collision probability is greater than or equal to the collision probability threshold; receive the resource adjustment signal sent by each user equipment; count a quantity of the resource adjustment signals; and determine a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor.

The first generating unit 602 is specifically configured to: when the quantity of the discovery resource collisions of the second reuse factor is greater than or equal to a second threshold, generate the indication for reducing a quantity of discovery resources of the first reuse factor; or when the quantity of the discovery resource collisions of the second reuse factor is less than a second threshold, generate the indication for increasing a quantity of discovery resources of the first reuse factor.

Figure 7:
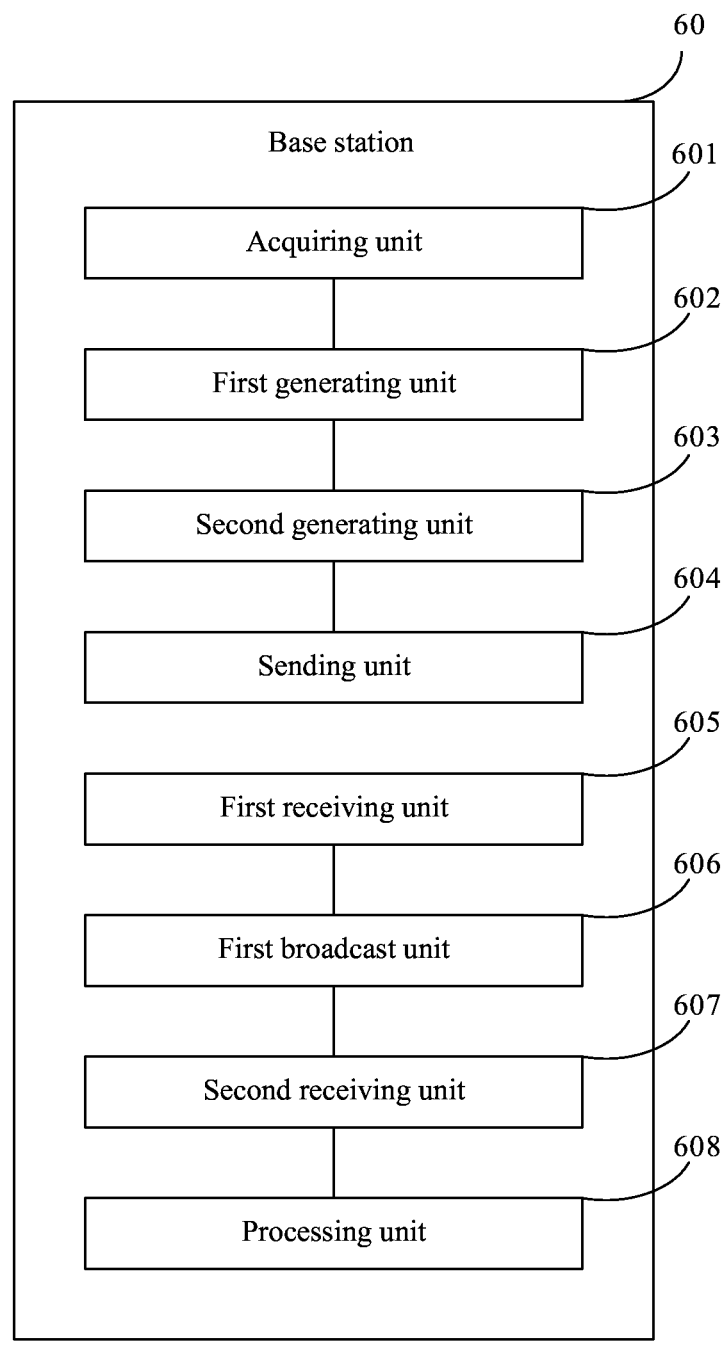
FIG. 7 is a schematic structural diagram of another base station according to an embodiment.

Further, as shown in FIG. 7, the base station 60 includes: a first receiving unit 605, configured to receive a discovery resource sent by the MME; a first broadcast unit 606, configured to broadcast a total set of current discovery resources of the cell, where the total set of the current discovery resources of the cell includes the discovery resources of the first reuse factor and discovery resources of the second reuse factor; a second receiving unit 607, configured to receive a resource application sent by the user equipment; and a processing unit 608, configured to allocate the discovery resources to the user equipment according to an allocation priority, where a priority of a corresponding discovery resource whose reuse factor is the second reuse factor and whose resource collision quantity is less than the second threshold is ranked first, a priority of a corresponding discovery resource whose reuse factor is the first reuse factor and whose resource collision quantity is less than a first threshold is ranked second, a priority of a corresponding discovery resource whose reuse factor is the first reuse factor and whose resource collision quantity is greater than or equal to the first threshold is ranked third, and a priority of a corresponding discovery resource whose reuse factor is the second reuse factor and whose resource collision quantity is less than or equal to the second threshold is ranked fourth.

Figure 8:
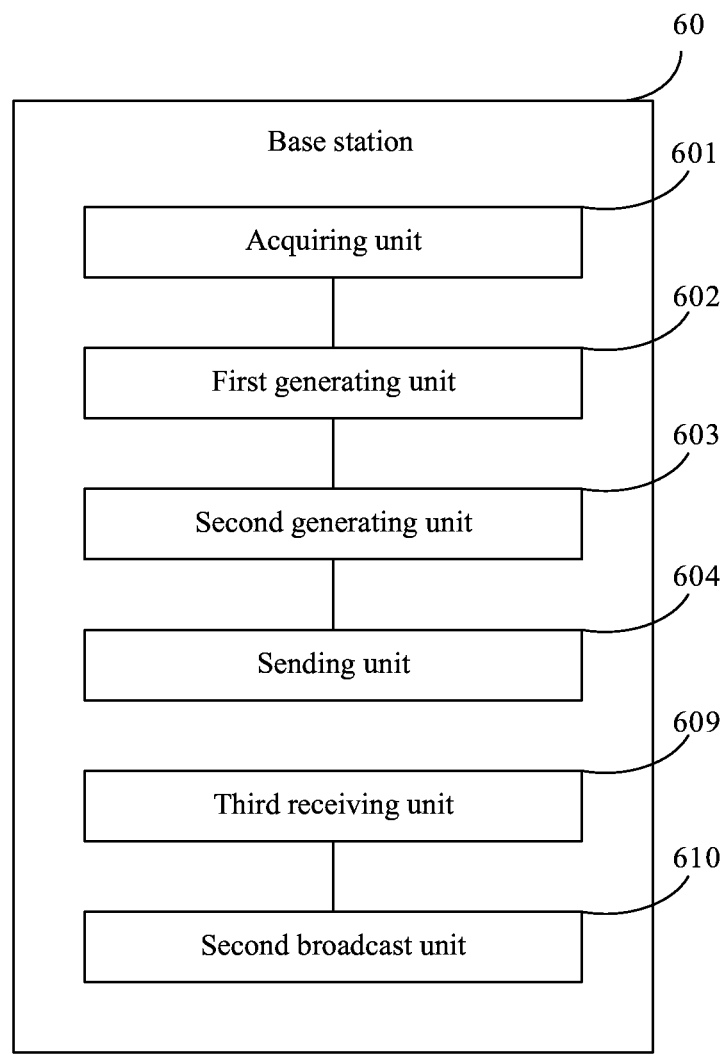
FIG. 8 is a schematic structural diagram of still another base station according to an embodiment.

As shown in FIG. 8, the base station 60 further includes: a third receiving unit 609, configured to receive a discovery resource sent by the MME; and a second broadcast unit 610, configured to broadcast a total set of current discovery resources of the cell and a set of the discovery resources of the first reuse factor, so that the user equipment selects a discovery resource according to the total set of the discovery resources and the set of the discovery resources of the first reuse factor, where the total set of the current discovery resources of the cell includes the discovery resources of the first reuse factor and discovery resources of the second reuse factor.

When the current resource indication is the resource utilization rate and the resource collision probability, the acquiring unit 601 is specifically configured to: acquire energy of a discovery beacon frame of the user equipment; if the energy of the discovery beacon frame is greater than or equal to a first preset threshold, perform cyclic redundancy check CRC parsing on a time frequency block at which the discovery beacon frame is located; if the CRC parsing is performed correctly, mark the time frequency block at which the discovery beacon frame is located as occupation; if the CRC parsing is performed incorrectly, mark the time frequency block at which the discovery beacon frame is located as collision; acquire a ratio of a quantity of the time frequency blocks marked as occupation to a total quantity of time frequency blocks to serve as the resource utilization rate; and acquire a ratio of a quantity of the time frequency blocks marked as collision to the total quantity of the time frequency blocks to serve as the resource collision probability; and if the resource utilization rate is less than a second preset threshold, generate the indication for reducing a quantity of discovery resources; and if the resource collision probability is greater than or equal to a third preset threshold, generate the indication for increasing a quantity of discovery resources.

In this embodiment, the discovery resource includes at least one time frequency block.

According to the base station provided in this embodiment, when a discovery resource of a cell cannot satisfy a requirement of a user equipment, an acquiring unit acquires a current resource indication of the cell according to a collision situation of the discovery resources in the current cell; a generating unit generates a resource adjustment indication according to the current resource indication of the cell acquired by the acquiring unit; and a sending unit sends a resource adjustment request to an MME, so that the MME allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 9:
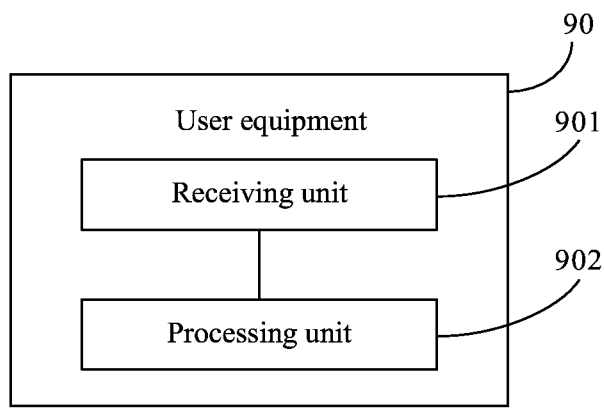
FIG. 9 is a schematic structural diagram of a user equipment according to an embodiment.

An embodiment provides a user equipment 90, as shown in FIG. 9, including: a receiving unit 901, configured to receive a total set of current discovery resources of a cell and a set of discovery resources of a first reuse factor that are broadcast by a base station, where the total set of the current discovery resources of the cell includes the discovery resources of the first reuse factor and discovery resources of a second reuse factor, the first reuse factor is greater than or equal to 6, and the second reuse factor is less than 6; and a processing unit 902, configured to select a discovery resource according to the total set of the discovery resources and the set of the discovery resources of the first reuse factor that are received by the receiving unit 901.

In this way, a receiving unit may receive a total set of current discovery resources of a cell and a set of discovery resources of a first reuse factor that are broadcast by a base station; and a processing unit may acquire a set of available resources according to information about the discovery resources that are received by the receiving unit, and preferably select a discovery resource in the set of the available resources, and therefore, flexibility in allocating discovery resources is improved.

The processing unit 902 is specifically configured to: select all available discovery resources from the total set of the discovery resources according to a first preset rule, to form a discovery resource subset; calculate an intersection set of the discovery resource subset and the discovery resources of the first reuse factor to obtain a set of available resources; and select a discovery resource from the set of the available resources.

Figure 10:
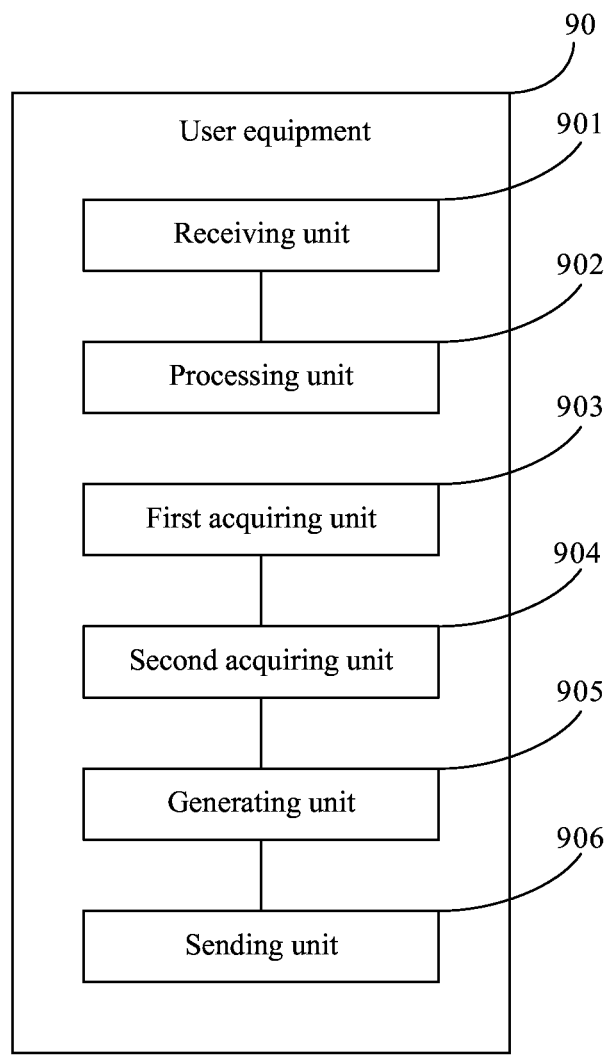
FIG. 10 is a schematic structural diagram of another user equipment according to an embodiment.

As shown in FIG. 10, the user equipment 90 further includes: a first acquiring unit 903, configured to acquire a collision probability threshold that is broadcast by the base station; a second acquiring unit 904, configured to acquire a collision probability of the user equipment; a generating unit 905, when the collision probability of the current equipment is greater than or equal to the collision probability threshold, configured to generate a resource adjustment signal; and a sending unit 906, configured to send the resource adjustment signal to the base station, so that the base station counts a quantity of the resource adjustment signals, and determines a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor.

In this embodiment, the discovery resource includes at least one time frequency block.

According to the user equipment provided in this embodiment, a receiving unit of the user equipment receives a total set of current discovery resources of a cell and a set of discovery resources of a first reuse factor that are broadcast by a base station; and a processing unit acquires a set of available resources according to information about the discovery resources that are received by the receiving unit, and preferably select a discovery resource in the set of the available resources, and therefore, flexibility in allocating discovery resources is improved.

An embodiment provides a resource allocation system, including: a base station described in any embodiment, where when a discovery resource of a cell cannot satisfy a requirement of a user equipment, the base station sends a resource adjustment request to an MME according to a collision situation of the discovery resources in the cell, so that the MME allocates the discovery resource of the cell according to the resource adjustment request; and a user equipment described in any embodiment, where the user equipment listens to broadcast of the base station, acquires a set of available resources according to a total set of current discovery resources of the cell and a set of discovery resources whose reuse factors are a first reuse factor that are broadcast, and preferably selects a discovery resource in the set of the available resources.

Figure 11:
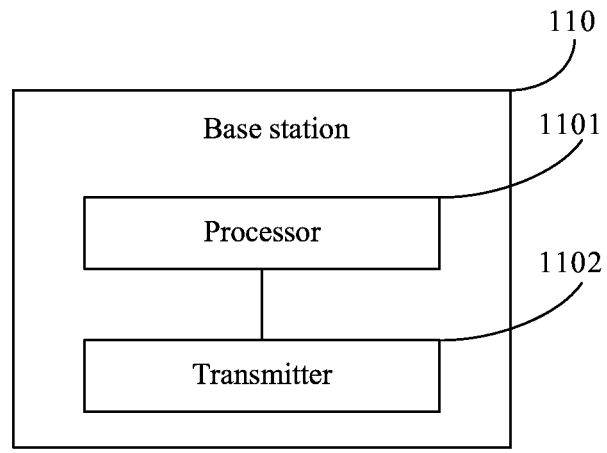
FIG. 11 is a schematic structural diagram of yet another base station according to an embodiment.

An embodiment provides a base station 110, as shown in FIG. 11, including: a processor 1101, configured to acquire a current resource indication of a cell; generate a resource adjustment indication according to the current resource indication of the cell, where the resource adjustment indication is used for instructing a mobility management entity MME to adjust a discovery resource allocated to the cell; and generate a resource adjustment request, where the resource adjustment request includes the resource adjustment indication; and a transmitter 1102, configured to send the resource adjustment request generated by the processor 1101, so that the MME adjusts the discovery resource of the cell according to the resource adjustment request.

In this way, when a discovery resource of a cell cannot satisfy a requirement of a user equipment, a processor of a base station acquires a current resource indication of the cell according to a collision situation of the discovery resources in the current cell, and generates a resource adjustment indication according to the acquired current resource indication of the cell; and a transmitter sends a resource adjustment request to an MME, so that the MME allocates the discovery resource of the cell according to the resource adjustment request. Compared with the prior art, flexibility in allocating the discovery resource and an entire utilization rate of the discovery resource are improved, and discovery performance of the discovery resource is ensured.

The current resource indication may be a quantity of resource collisions, or may be a resource utilization rate and a resource collision probability. When the current resource indication is a quantity of resource collisions, the resource adjustment indication includes an indication for reducing a quantity of discovery resources of a first reuse factor or an indication for increasing a quantity of discovery resources of a first reuse factor; or when the current resource indication is a resource utilization rate and a resource collision probability, the resource adjustment indication includes an indication for reducing a quantity of discovery resources or an indication for increasing a quantity of discovery resources.

When the current resource indication is the quantity of resource collisions, the discovery resource of the cell includes discovery resources of at least two reuse factors. The two reuse factors are the first reuse factor and a second reuse factor, the first reuse factor is greater than or equal to 6, and the second reuse factor is less than 6.

The transmitter 1102 is specifically configured to: broadcast a collision probability threshold, so that each user equipment reports a resource adjustment signal when a collision probability is greater than or equal to the collision probability threshold.

Figure 12:
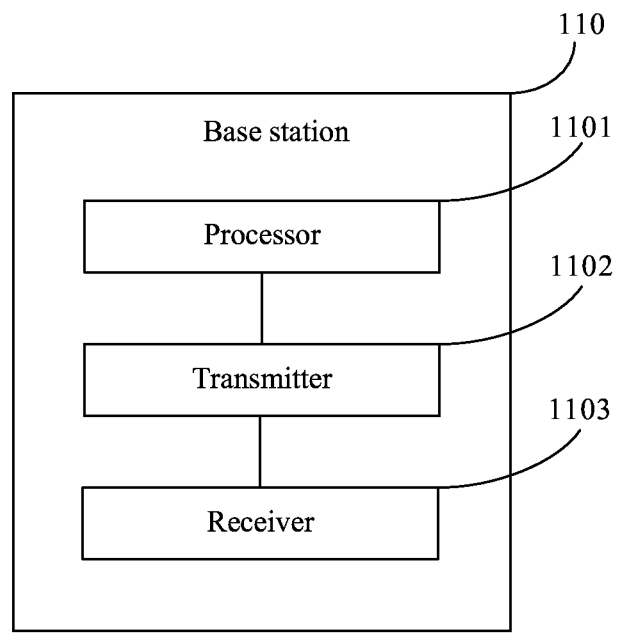
FIG. 12 is a schematic structural diagram of still yet another base station according to an embodiment.

As shown in FIG. 12, the base station 110 further includes: a receiver 1103, configured to receive the resource adjustment signal sent by each user equipment; and the processor 1101 is further configured to count a quantity of the resource adjustment signals; and determine a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor.

The processor 1101 is further configured to: when the quantity of the discovery resource collisions of the second reuse factor is greater than or equal to a second threshold, generate the indication for reducing a quantity of discovery resources of the first reuse factor; or when the quantity of the discovery resource collisions of the second reuse factor is less than a second threshold, generate the indication for increasing a quantity of discovery resources of the first reuse factor.

Further, when the current resource indication is the quantity of resource collisions, the receiver 1103 may be further configured to receive a discovery resource sent by the MME.

The transmitter 1103 is further configured to broadcast a total set of current discovery resources of the cell, where the total set of the current discovery resources of the cell includes the discovery resources of the first reuse factor and discovery resources of the second reuse factor; the receiver 1103 is further configured to receive a resource application sent by the user equipment; and the processor 1101 is further configured to allocate the discovery resources to the user equipment according to an allocation priority, where a priority of a corresponding discovery resource whose reuse factor is the second reuse factor and whose resource collision quantity is less than the second threshold is ranked first, a priority of a corresponding discovery resource whose reuse factor is the first reuse factor and whose resource collision quantity is less than a first threshold is ranked second, a priority of a corresponding discovery resource whose reuse factor is the first reuse factor and whose resource collision quantity is greater than or equal to the first threshold is ranked third, and a priority of a corresponding discovery resource whose reuse factor is the second reuse factor and whose resource collision quantity is less than or equal to the second threshold is ranked fourth.

The receiver 1103 is further configured to receive a discovery resource sent by the MME.

The transmitter 1102 is further configured to broadcast a total set of current discovery resources of the cell and a set of the discovery resources of the first reuse factor, so that the user equipment selects a discovery resource according to the total set of the discovery resources and the set of the discovery resources of the first reuse factor, where the total set of the current discovery resources of the cell includes the discovery resources of the first reuse factor and discovery resources of the second reuse factor.

When the current resource indication is the resource utilization rate and the resource collision probability, the processor 1101 is specifically configured to: acquire energy of a discovery beacon frame of the user equipment; if the energy of the discovery beacon frame is greater than or equal to a first preset threshold, perform cyclic redundancy check CRC parsing on a time frequency block at which the discovery beacon frame is located; if the CRC parsing is performed correctly, mark the time frequency block at which the discovery beacon frame is located as occupation; if the CRC parsing is performed incorrectly, mark the time frequency block at which the discovery beacon frame is located as collision; acquire a ratio of a quantity of the time frequency blocks marked as occupation to a total quantity of time frequency blocks to serve as the resource utilization rate; and acquire a ratio of a quantity of the time frequency blocks marked as collision to the total quantity of the time frequency blocks to serve as the resource collision probability.

The processor 1101 is further configured to: if the resource utilization rate is less than a second preset threshold, generate the indication for reducing a quantity of discovery resources; and if the resource collision probability is greater than or equal to a third preset threshold, generate the indication for increasing a quantity of discovery resources.

In this embodiment, the discovery resource includes at least one time frequency block.

According to the base station provided in this embodiment, when a discovery resource of a cell cannot satisfy a requirement of a user equipment, a processor of the base station acquires a current resource indication of the cell according to a collision situation of the discovery resources in the current cell, and generates a resource adjustment indication according to the acquired current resource indication of the cell; and a transmitter sends a resource adjustment request to an MME, so that the MME allocates the discovery resource of the cell according to the resource adjustment request. Compared with the prior art, flexibility in allocating the discovery resource and an entire utilization rate of the discovery resource are improved, and discovery performance of the discovery resource is ensured.

Figure 13:
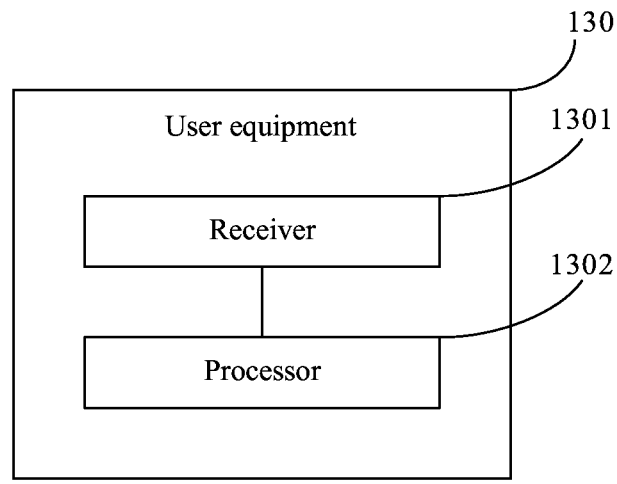
FIG. 13 is a schematic structural diagram of still another user equipment according to an embodiment.

An embodiment provides a user equipment 130, as shown in FIG. 13, including: a receiver 1301, configured to receive a total set of current discovery resources of a cell and a set of discovery resources of a first reuse factor that are broadcast by a base station, where the total set of the current discovery resources of the cell includes the discovery resources of the first reuse factor and discovery resources of a second reuse factor, the first reuse factor is greater than or equal to 6, and the second reuse factor is less than 6; and a processor 1302, configured to select a discovery resource according to the total set of the discovery resources and the set of the discovery resources of the first reuse factor that are received by the receiver 1301.

In this way, a receiver may receive a total set of current discovery resources of a cell and a set of discovery resources of a first reuse factor that are broadcast by a base station; and a processor may acquire a set of available resources according to information about the discovery resources that are received by the receiver, and preferably select a discovery resource in the set of the available resources, and therefore, flexibility in allocating discovery resources is improved.

The processor 1302 is specifically configured to: select all available discovery resources from the total set of the discovery resources according to a first preset rule, to form a discovery resource subset; calculate an intersection set of the discovery resource subset and the discovery resources of the first reuse factor to obtain a set of available resources; and select a discovery resource from the set of the available resources.

The processor 1302 is further configured to: acquire a collision probability threshold that is broadcast by the base station; acquire a collision probability of the user equipment; and when the collision probability of the user equipment is greater than or equal to the collision probability threshold, generate a resource adjustment signal.

Figure 14:
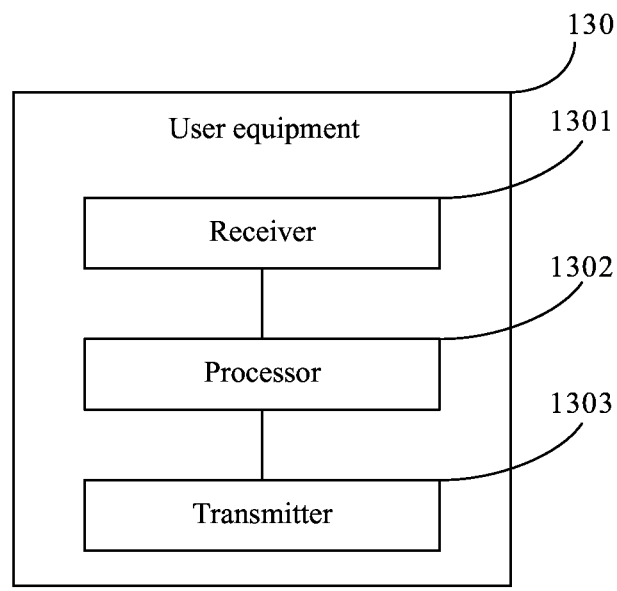
FIG. 14 is a schematic structural diagram of yet another user equipment according to an embodiment.

As shown in FIG. 14, the user equipment 130 further includes: a transmitter 1303, configured to send the resource adjustment signal to the base station, so that the base station counts a quantity of the resource adjustment signals, and determines a current quantity of resource collisions in the cell according to the quantity of the resource adjustment signals, where the current quantity of the resource collisions in the cell includes: a quantity of discovery resource collisions of the first reuse factor and a quantity of discovery resource collisions of the second reuse factor.

In this embodiment, the discovery resource includes at least one time frequency block.

According to the user equipment provided in this embodiment, a receiver of the user equipment may receive a total set of current discovery resources of a cell and a set of discovery resources of a first reuse factor that are broadcast by a base station, and a processor may acquire a set of available resources according to information about the discovery resources that are received by the receiver, and preferably select a discovery resource in the set of the available resources, and therefore, flexibility in allocating discovery resources is improved.

An embodiment provides a resource allocation system, including: a base station described in any embodiment, where when a discovery resource of a cell cannot satisfy a requirement of a user equipment, the base station sends a resource adjustment request to an MME according to a collision situation of the discovery resource in the cell, so that the MME allocates the discovery resource of the cell according to the resource adjustment request; and a user equipment described in any embodiment, where the user equipment listens to broadcast of the base station, acquires a set of available resources according to a total set of current discovery resources of the cell and a set of discovery resources whose reuse factors are a first reuse factor that are broadcast, and preferably selects a discovery resource in the set of the available resources.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The foregoing integrated unit may be implemented in a form of hardware, or may be implemented in a form of hardware in addition to a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A resource allocation method, comprising:
   acquiring, by a base station, a current resource indication of a cell;
   generating, by the base station, a resource adjustment indication according to the current resource indication of the cell, wherein the resource adjustment indication instructs a mobility management entity (MME) to adjust a discovery resource allocated to the cell;
   generating, by the base station, a resource adjustment request, wherein the resource adjustment request comprises the resource adjustment indication; and
   sending the resource adjustment request, by a transmitter of the base station, so that the MME adjusts the discovery resource of the cell according to the resource adjustment request.

2. The method according to claim 1, wherein the current resource indication is a quantity of resource collisions.

3. The method according to claim 2, further comprising:
   receiving, by a receiver, a discovery resource sent by the MME;
   broadcasting a total set of current discovery resources of the cell, wherein the total set of the current discovery resources of the cell comprises discovery resources of a first reuse factor and discovery resources of a second reuse factor;
   receiving a resource application sent by a user equipment; and
   allocating the discovery resources to the user equipment according to an allocation priority;
   wherein a priority of a corresponding discovery resource whose reuse factor is the second reuse factor and whose resource collision quantity is less than a second threshold is ranked first in the allocation priority, a priority of a corresponding discovery resource whose reuse factor is the first reuse factor and whose resource collision quantity is less than a first threshold is ranked second in the allocation priority, a priority of a corresponding discovery resource whose reuse factor is the first reuse factor and whose resource collision quantity is greater than or equal to the first threshold is ranked third in the allocation priority, and a priority of a corresponding discovery resource whose reuse factor is the second reuse factor and whose resource collision quantity is less than or equal to the second threshold is ranked fourth in the allocation priority.

4. The method according to claim 2, further comprising:
   receiving a discovery resource sent by the MME; and
   broadcasting a total set of current discovery resources of the cell and a set of discovery resources of a first reuse factor, so that a user equipment selects a discovery resource according to the total set of the current discovery resources and the set of the discovery resources of the first reuse factor;
   wherein the total set of the current discovery resources of the cell comprises the discovery resources of the first reuse factor and discovery resources of a second reuse factor.

5. The method according to claim 1, wherein the current resource indication comprises a resource utilization rate and a resource collision probability.

6. The method according to claim 5, wherein acquiring a current resource indication of a cell comprises:
   acquiring energy of a discovery beacon frame of a user equipment;
   in response to the energy of the discovery beacon frame being greater than or equal to a first preset threshold, performing cyclic redundancy check (CRC) parsing on a time frequency block at which the discovery beacon frame is located;
   in response to the CRC parsing being performed correctly, marking the time frequency block at which the discovery beacon frame is located as occupation;
   in response to the CRC parsing being performed incorrectly, marking the time frequency block at which the discovery beacon frame is located as collision;
   acquiring a ratio of a quantity of the time frequency blocks marked as occupation to a total quantity of time frequency blocks to serve as the resource utilization rate; and
   acquiring a ratio of a quantity of the time frequency blocks marked as collision to the total quantity of the time frequency blocks to serve as the resource collision probability.

7. A base station, comprising:
   a receiver;
   a processor, configured to:
      acquire a current resource indication of a cell;
      generate a resource adjustment indication according to the current resource indication of the cell, wherein the resource adjustment indication is used for instructing a mobility management entity (MME) to adjust a discovery resource allocated to the cell; and
      generate a resource adjustment request, wherein the resource adjustment request comprises the resource adjustment indication; and
   a transmitter, configured to send the resource adjustment request generated by the processor, so that the MME adjusts the discovery resource of the cell according to the resource adjustment request.

8. The base station according to claim 7, wherein the current resource indication comprises a quantity of resource collisions.

9. The base station according to claim 8, wherein:
   the receiver is further configured to receive a discovery resource sent by the MME;
   the transmitter is further configured to broadcast a total set of current discovery resources of the cell, wherein the total set of the current discovery resources of the cell comprises discovery resources of a first reuse factor and discovery resources of a second reuse factor;
   the receiver is further configured to receive a resource application sent by a user equipment; and the processor is further configured to allocate the discovery resources to the user equipment according to an allocation priority;

wherein a priority of a corresponding discovery resource whose reuse factor is the second reuse factor and whose resource collision quantity is less than a second threshold is ranked first in the allocation priority, a priority of a corresponding discovery resource whose reuse factor is the first reuse factor and whose resource collision quantity is less than a first threshold is ranked second in the allocation priority, a priority of a corresponding discovery resource whose reuse factor is the first reuse factor and whose resource collision quantity is greater than or equal to the first threshold is ranked third in the allocation priority, and a priority of a corresponding discovery resource whose reuse factor is the second reuse factor and whose resource collision quantity is less than or equal to the second threshold is ranked fourth in the allocation priority.

10. The base station according to claim 8, wherein:

the receiver is further configured to receive a discovery resource sent by the MME;

the transmitter is further configured to broadcast a total set of current discovery resources of the cell and a set of discovery resources of a first reuse factor, so that a user equipment selects a discovery resource according to the total set of the discovery resources and the set of the discovery resources of the first reuse factor;

the total set of the current discovery resources of the cell comprises the discovery resources of the first reuse factor and discovery resources of a second reuse factor.

11. The base station according to claim 7, wherein the current resource indication comprises a resource utilization rate and a resource collision probability.

12. The base station according to claim 11, wherein the processor is further configured to:

acquire energy of a discovery beacon frame of a user equipment;

in response to the energy of the discovery beacon frame being greater than or equal to a first preset threshold, perform cyclic redundancy check (CRC) parsing on a time frequency block at which the discovery beacon frame is located;

in response to the CRC parsing being performed correctly, mark the time frequency block at which the discovery beacon frame is located as occupation;

in response to the CRC parsing being performed incorrectly, mark the time frequency block at which the discovery beacon frame is located as collision;

acquire a ratio of a quantity of the time frequency blocks marked as occupation to a total quantity of time frequency blocks to serve as the resource utilization rate; and acquire a ratio of a quantity of the time frequency blocks marked as collision to the total quantity of the time frequency blocks to serve as the resource collision probability.

* * * * *